United States Patent
Chae et al.

(10) Patent No.: US 9,813,108 B2
(45) Date of Patent: *Nov. 7, 2017

(54) METHOD OF GENERATING BINARY OFFSET CARRIER CORRELATION FUNCTION BASED ON PARTIAL CORRELATION FUNCTIONS, APPARATUS FOR TRACKING BINARY OFFSET CARRIER SIGNAL, AND SPREAD SPECTRUM SIGNAL RECEIVER SYSTEM USING THE SAME

(71) Applicant: RESEARCH & BUSINESS FOUNDATION SUNGKYUNKWAN UNIVERSITY, Suwon-si (KR)

(72) Inventors: Keun Hong Chae, Suwon-si (KR); Seok Ho Yoon, Suwon-si (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/160,187

(22) Filed: May 20, 2016

(65) Prior Publication Data

US 2016/0269073 A1    Sep. 15, 2016

Related U.S. Application Data

(62) Division of application No. 14/525,937, filed on Oct. 28, 2014, now abandoned.

(30) Foreign Application Priority Data

Oct. 29, 2013    (KR) .................. 10-2013-0129223

(51) Int. Cl.
H04B 1/707    (2011.01)
H04B 1/7085    (2011.01)
(Continued)

(52) U.S. Cl.
CPC ............ *H04B 1/7085* (2013.01); *G01S 19/30* (2013.01); *H04B 1/70752* (2013.01); *H04B 2001/70706* (2013.01); *H04B 2201/707* (2013.01)

(58) Field of Classification Search
CPC .............. H04B 1/70785; H04B 1/7085; H04B 2001/70706
(Continued)

(56) References Cited

U.S. PATENT DOCUMENTS 9,172,524 B2 * 10/2015 Yoon .................. G01S 19/30
9,231,649 B2 *  1/2016 Chae .................. H03L 7/06
(Continued)

*Primary Examiner* — Kevin M Burd
(74) *Attorney, Agent, or Firm* — NSIP Law

(57) ABSTRACT

A method of generating a BOC correlation function based on partial correlation functions, an apparatus for tracking a BOC signal, and a spread spectrum signal receiver system using the same are disclosed herein. The apparatus includes a frequency offset compensation unit, a local code generation unit, a mixer, a delay lock loop (DLL), a phase lock loop (PLL), and a data extraction unit. The frequency offset compensation unit outputs a compensated received signal with respect to a received signal. The local code generation unit generates a delay-compensated local code based on a code delay value. The mixer mixes the delay-compensated local code with the frequency offset-compensated received signal. The DLL repeatedly tracks and calculates a code delay value. The PLL repeatedly calculates a carrier frequency compensation value. The data extraction unit extracts spreading data from a mixture of the delay-compensated local code and the compensated received signal.

20 Claims, 11 Drawing Sheets

(51) Int. Cl.
*H04B 1/7075* (2011.01)
*G01S 19/30* (2010.01)

(58) Field of Classification Search
USPC .............................. 375/130, 140, 147, 150
See application file for complete search history.

(56) References Cited

U.S. PATENT DOCUMENTS

| | | | |
|---|---|---|---|
| 9,319,097 B2* | 4/2016 | Chae | H04B 1/709 |
| 9,350,413 B2* | 5/2016 | Chae | H04B 1/7075 |
| 2009/0262018 A1 | 10/2009 | Vasilyev et al. | |
| 2010/0002752 A1* | 1/2010 | Lomp | H04B 1/707 |
| | | | 375/141 |

* cited by examiner

[FIG. 1]
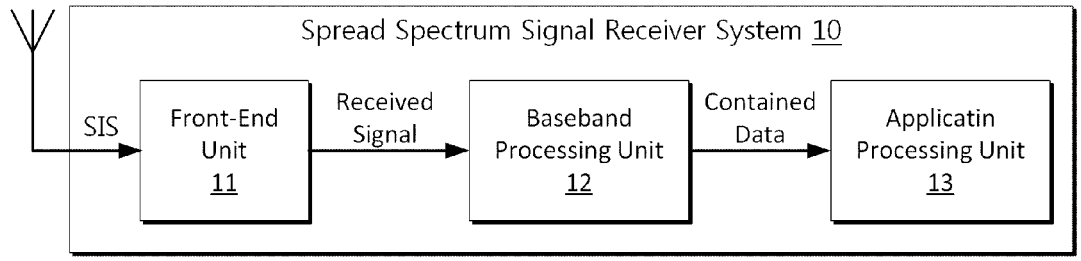
[FIG. 2]
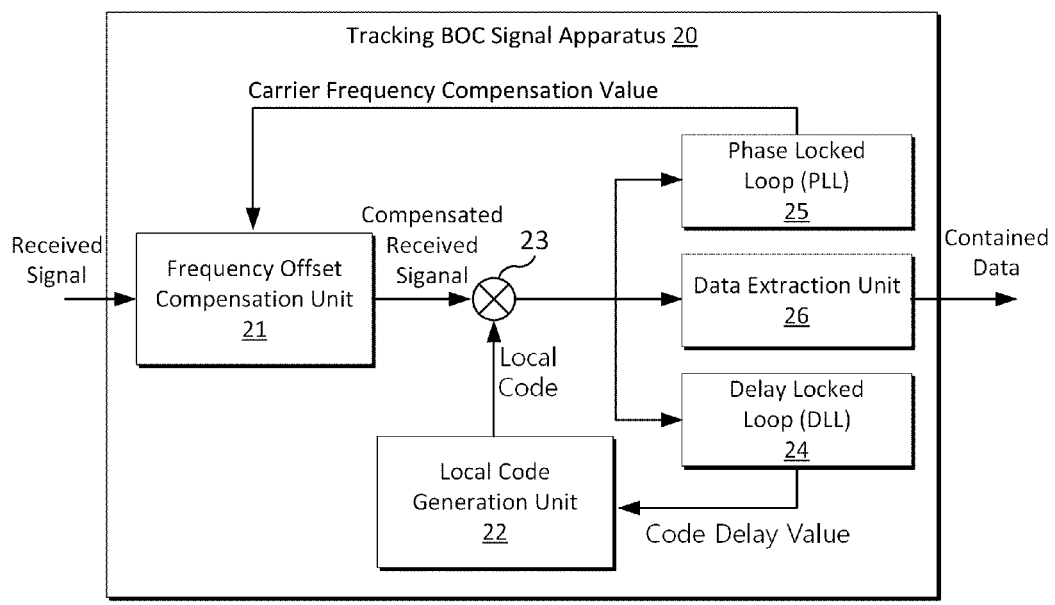

[FIG. 3]
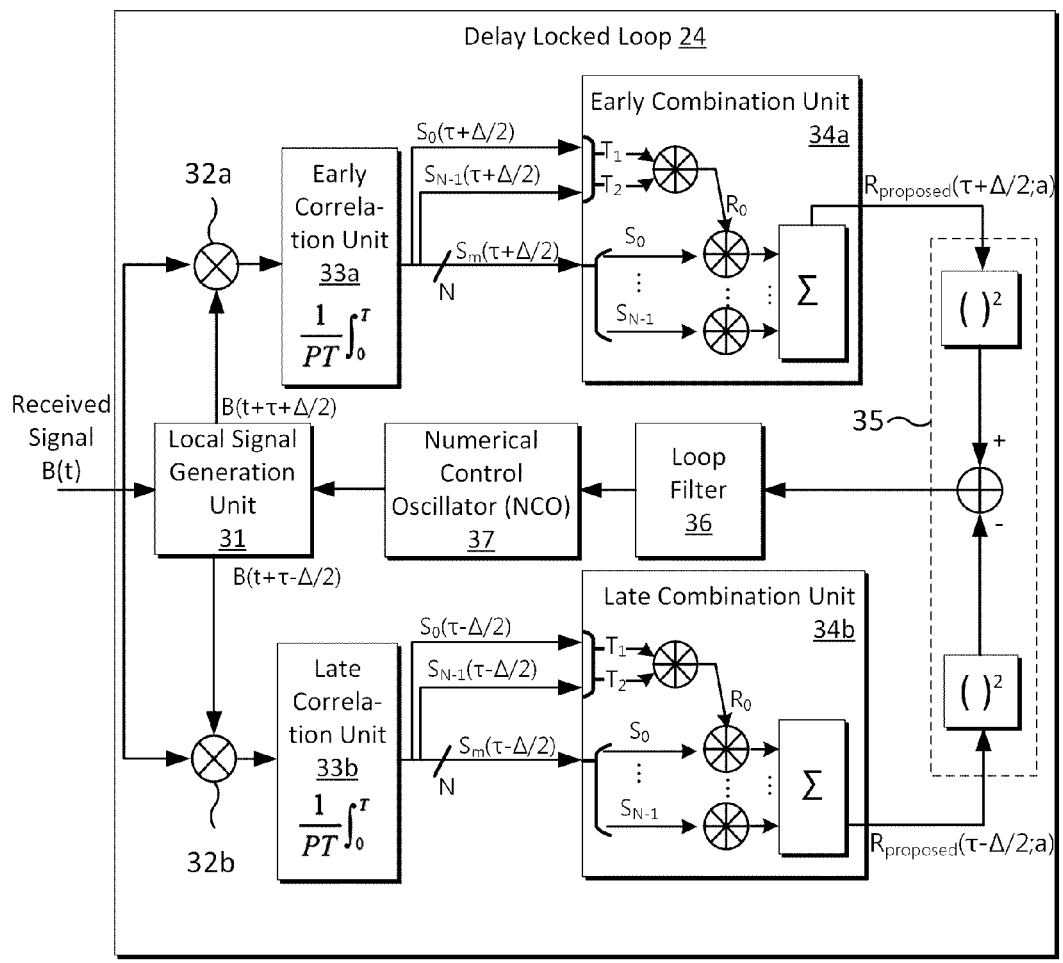

[FIG. 4]
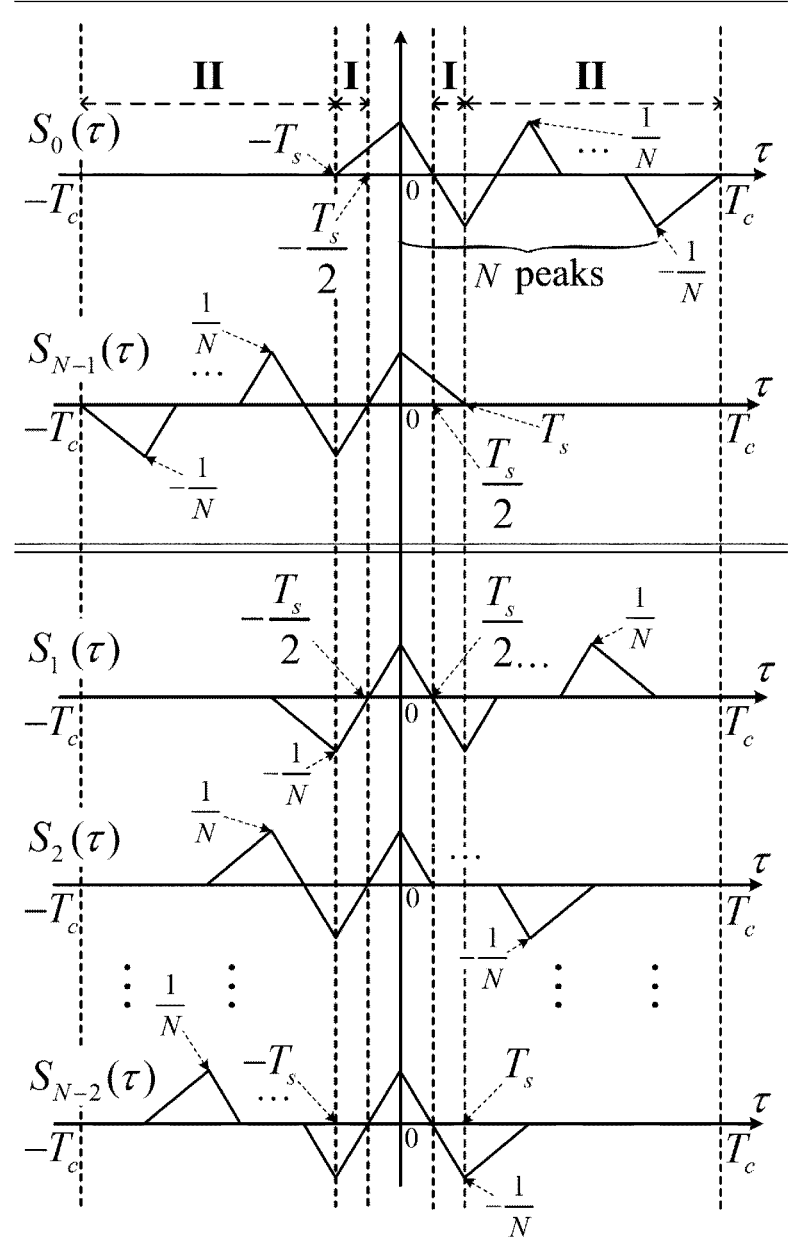

[FIG. 5]
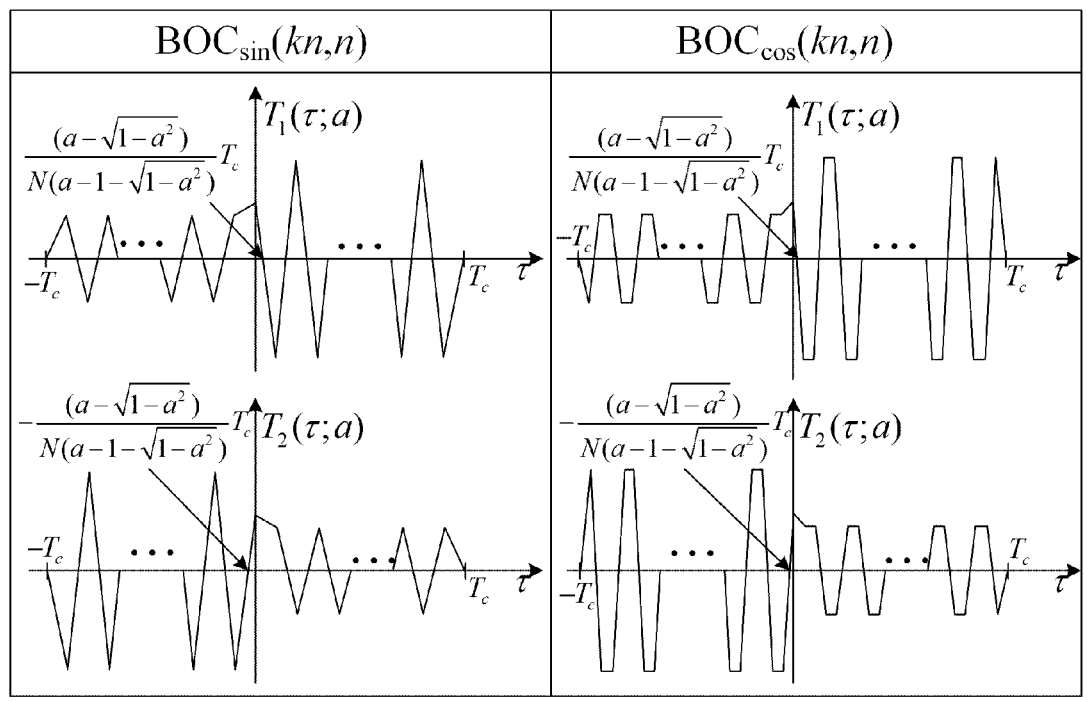

[FIG. 6]
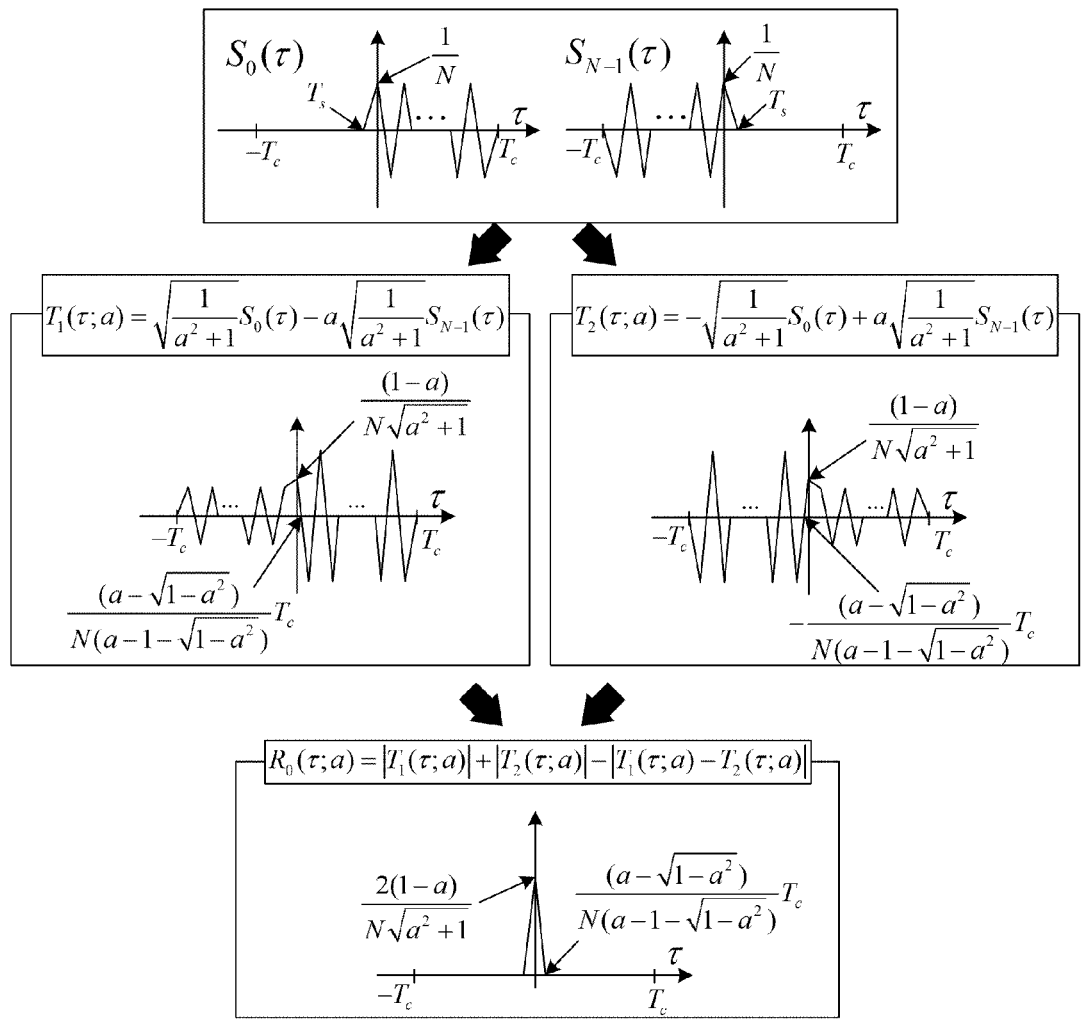

[FIG. 7]
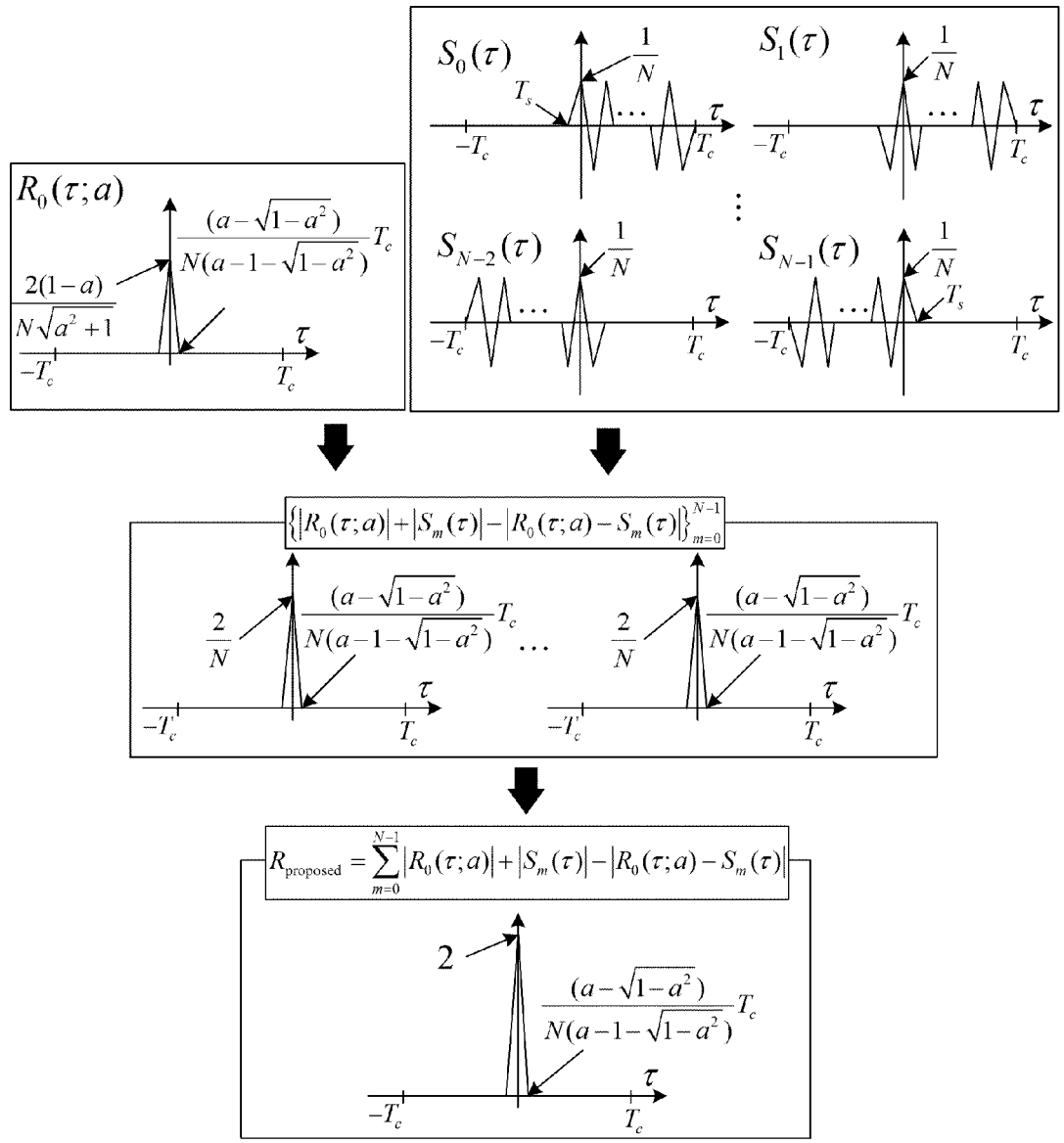

[FIG. 8]
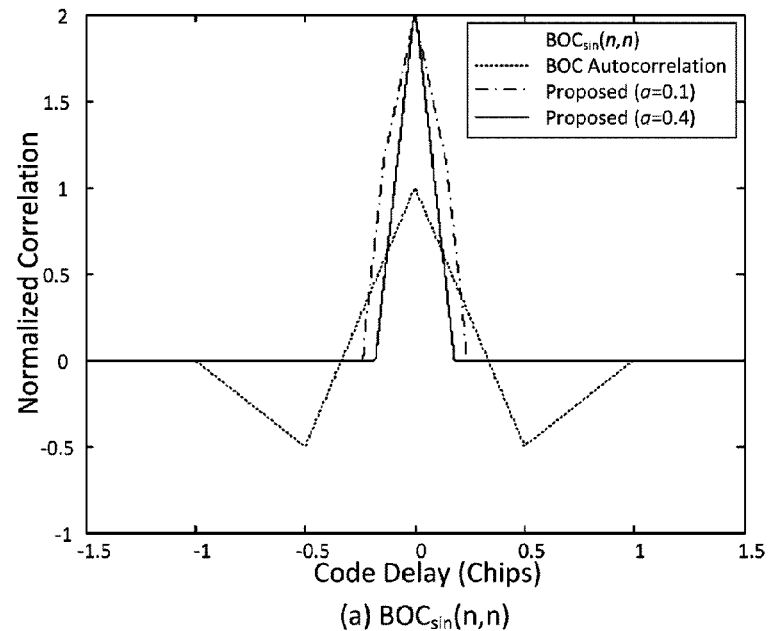
(a) BOC$_{sin}$(n,n)
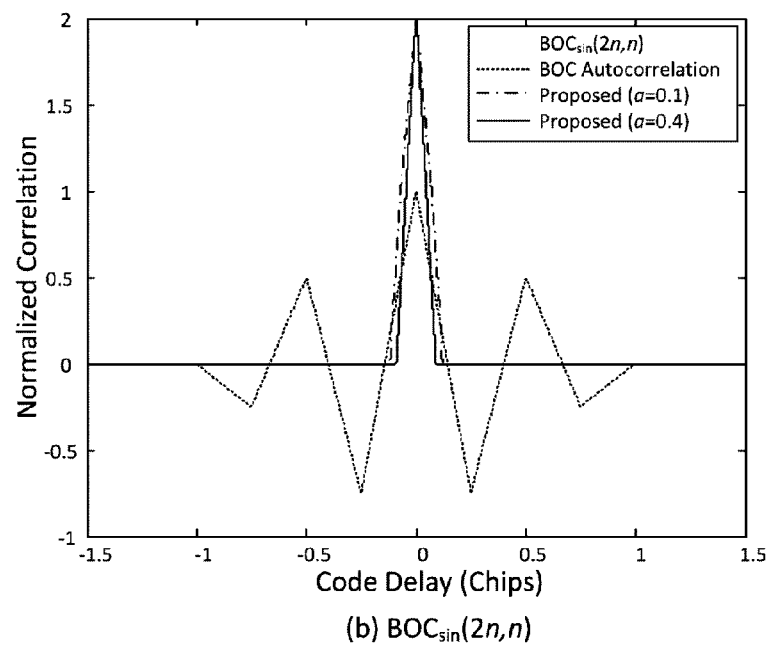
(b) BOC$_{sin}$(2n,n)

[FIG. 9]
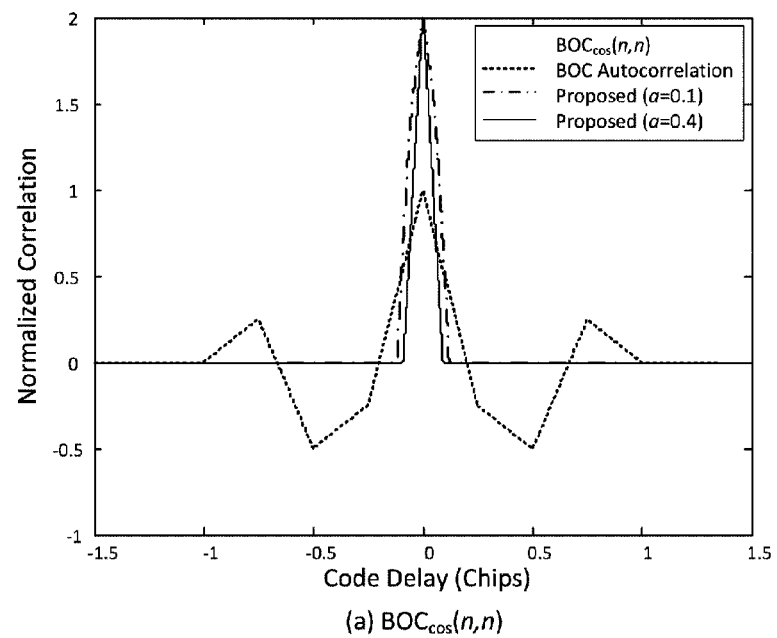
(a) $BOC_{cos}(n,n)$
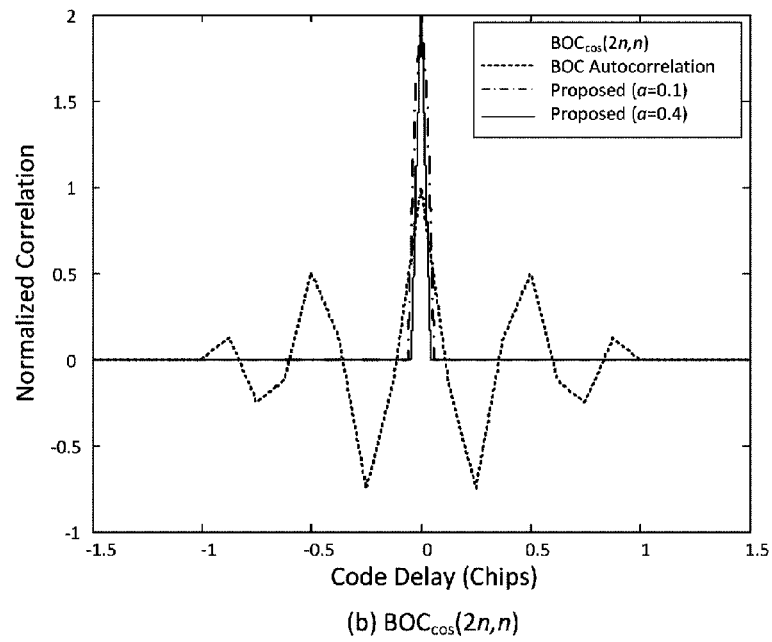
(b) $BOC_{cos}(2n,n)$

[FIG. 10]
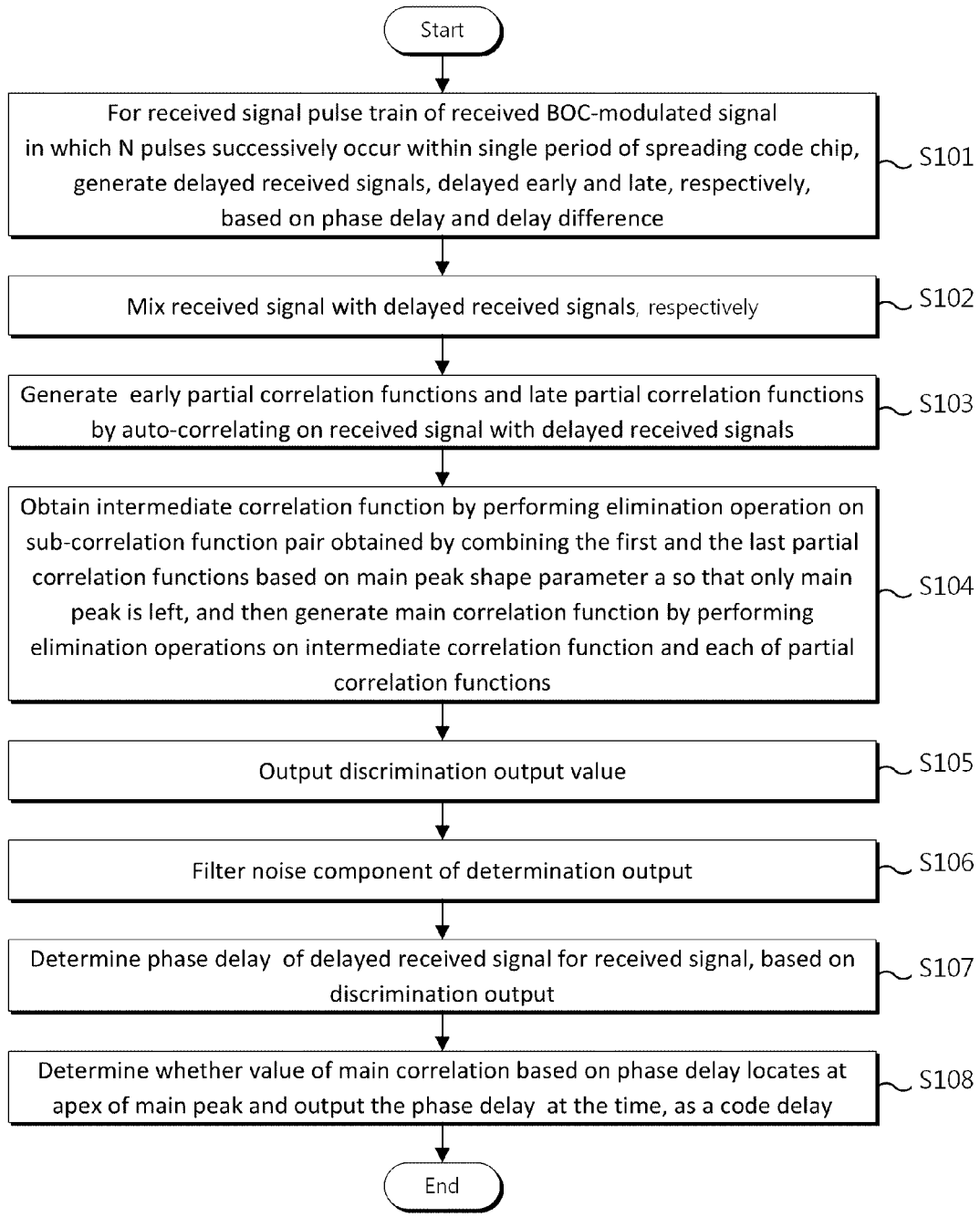

[FIG. 11]
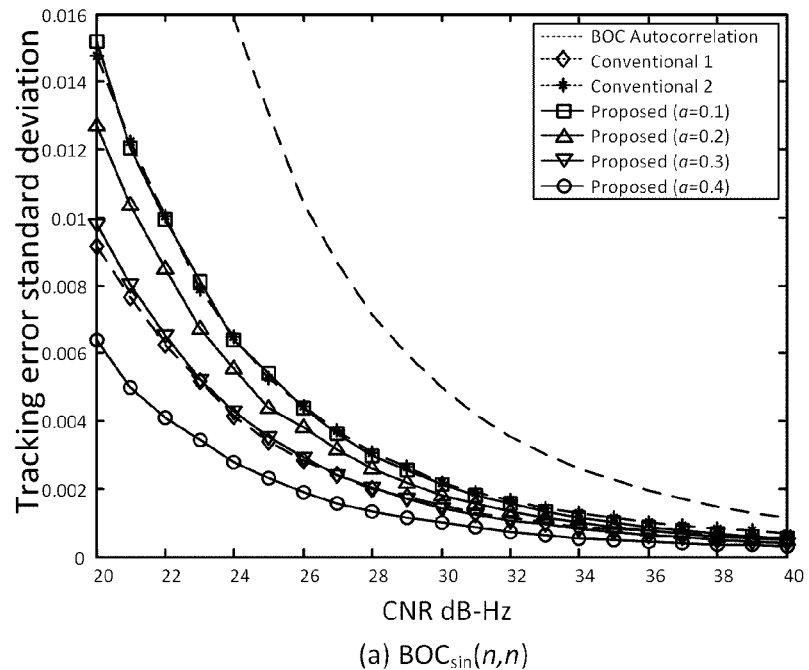
(a) $BOC_{sin}(n,n)$
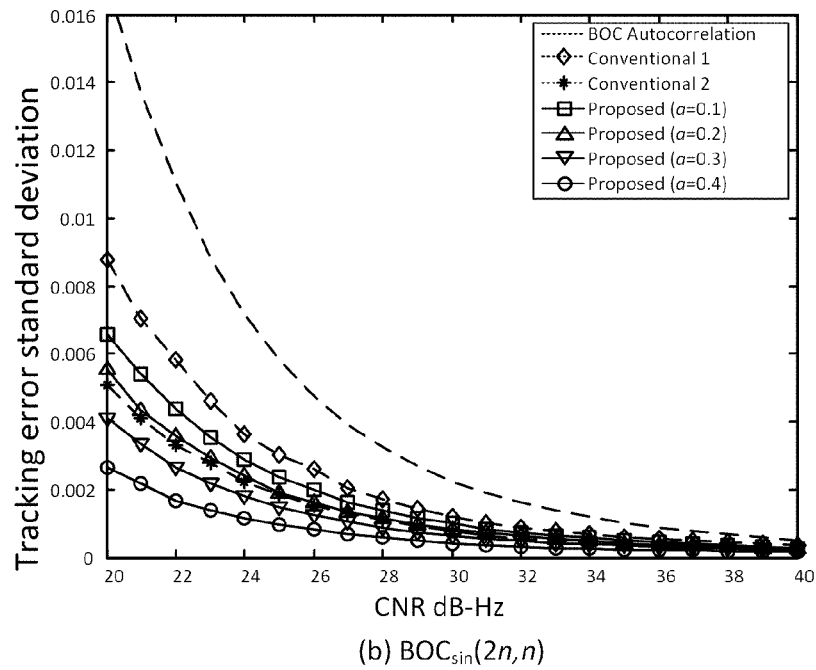
(b) $BOC_{sin}(2n,n)$

[FIG. 12]
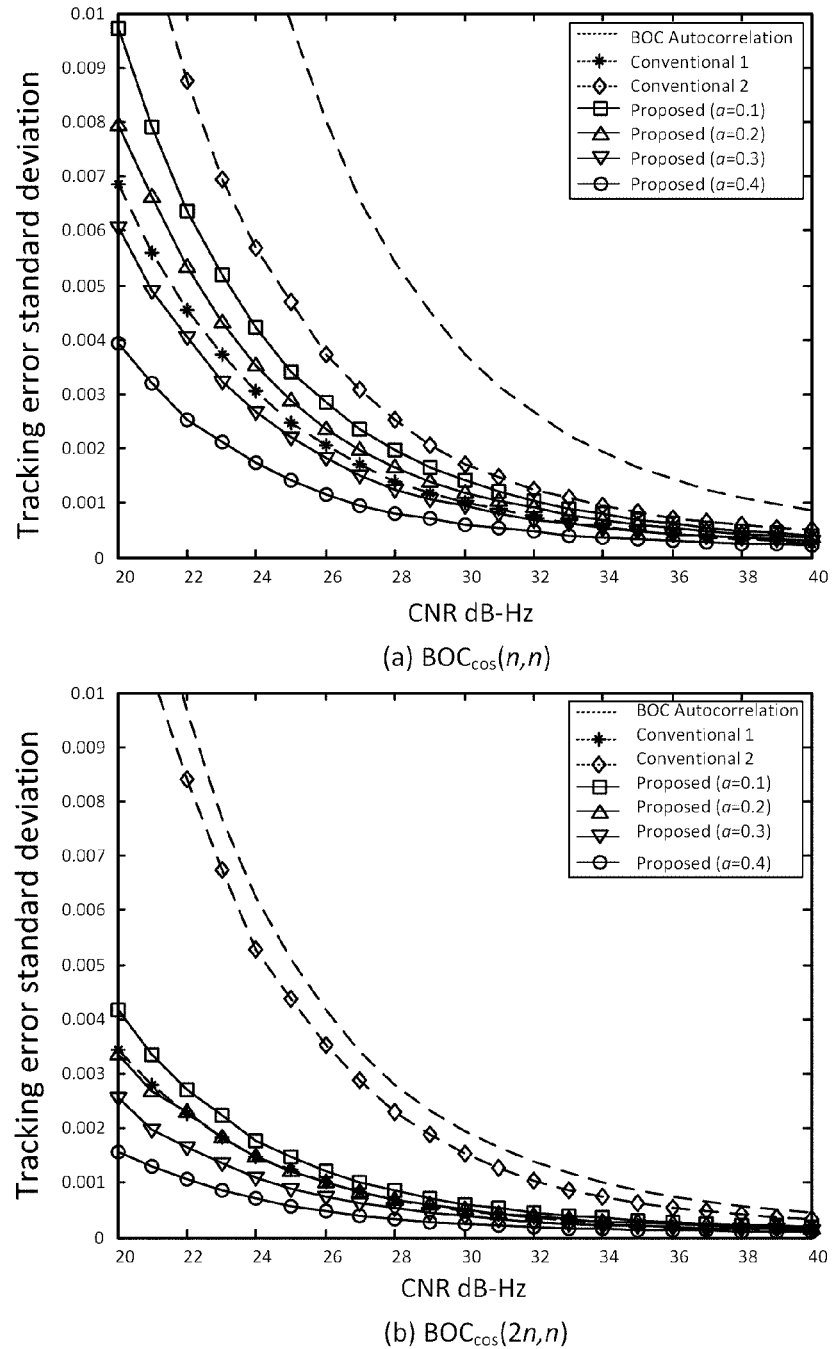
(a) $BOC_{cos}(n,n)$
(b) $BOC_{cos}(2n,n)$

METHOD OF GENERATING BINARY OFFSET CARRIER CORRELATION FUNCTION BASED ON PARTIAL CORRELATION FUNCTIONS, APPARATUS FOR TRACKING BINARY OFFSET CARRIER SIGNAL, AND SPREAD SPECTRUM SIGNAL RECEIVER SYSTEM USING THE SAME

CROSS-REFERENCE TO RELATED APPLICATIONS

This application is a divisional of U.S. patent application Ser. No. 14/525,937 filed on Oct. 28, 2014, which claims the foreign priority benefit of Korean Patent Application No. 10-2013-0129223 filed with the Korea Intellectual Property Office on Oct. 29, 2013, the entire disclosure of which is incorporated herein by reference for all purposes.

BACKGROUND

1. Field

The present disclosure relates generally to spread spectrum signal technology and, more particularly, to a scheme for tracking a binary offset carrier (BOC) signal that is used in spread spectrum signal technology.

2. Description of the Related Art

Spread spectrum technology has been increasingly widely used in digital wireless communication due to its excellent security performance and its characteristic of being robust to noise and jamming.

In satellite navigation technology corresponding to a representative application field of spread spectrum technology, when a plurality of navigation satellites randomly transmit a plurality of satellite navigation signals, each containing information about the current location and time of the corresponding navigation satellite, to the ground, a satellite navigation receiver on the ground receives the plurality of satellite navigation signals, calculates the coordinates of the current locations of the navigation satellites and the arrival times of the signals, and determines its three-dimensional (3D) location in the Earth coordinate system using triangulation.

A satellite navigation receiver theoretically requires at least three satellite signals in order to determine its longitude, latitude and height, and requires one more satellite signals in order to improve accuracy by eliminating time error between satellites. Accordingly, at least four satellites are required.

Many countries have developed independent satellite navigation systems for economic and military reasons. Although the United States Global Positioning System (GPS) is most widely used and famous, the European Union's Galileo system, the Russian GLONASS, the Chinese COMPASS system, and the Japanese QZSS system (which will be expanded to the JRANS system in the future) are also being currently operated or developed.

Since satellite navigation signals should be robust to interference and jamming, various and elaborate modulation schemes have been employed. It is worthy of notice that the majority of the next-generation satellite navigation systems have replaced a conventional a phase shift keying (PSK) modulation scheme or have employed a BOC modulation scheme in addition to a PSK modulation scheme. The width of the main peak of an auto-correlation function used for the BOC modulation scheme is short, and thus the BOC modulation scheme exhibits better signal tracking performance than the PSK modulation scheme.

Furthermore, the BOC modulation scheme is characterized in that spectral separation occurs and energy is shifted from the center of a band to the periphery thereof, unlike the PSK modulation scheme, and thus the BOC modulation scheme can be additionally applied to a band in which a conventional modulation scheme has been used. Using these characteristics, the next-generation satellite navigation systems can employ the BOC modulation scheme in addition to the PSK modulation scheme, thereby being able to ensure the improvement of performance and backward compatibility.

A BOC signal is a signal that is expressed as a product of a pseudo random noise (PRN) code with a sine or cosine rectangular sub-carrier. A BOC signal is expressed as a $BOC_{sin}(kn,n)$ or a $BOC_{cos}(kn,n)$ depending on the type of sub-carrier, where k is a positive integer indicative of the ratio of the chip period of a PRN code to the period of a sub-carrier, and n is indicative of the ratio of PRN code chip transmission rate to 1.023 MHz, that is, the clock frequency of a C/A code.

Although a BOC signal has high signal tracking performance and excellent compatibility with the conventional PSK modulation scheme, it is problematic in that many side peaks occur around a main peak where an auto-correlation function has the highest value, unlike the PSK scheme having a single peak. A problem in which, upon tracking a BOC signal, synchronization is established with a side peak instead of a main peak due to the presence of side peaks, that is, the so-called ambiguity problem, may occur.

Conventional BOC signal tracking schemes are disclosed in: the paper by Z. Yao, X. Cui, M. Lu, Z. Feng, and J. Yang, "Pseudo-Correlation-Function-based Unambiguous Tracking Technique for Sine-BOC Signals," IEEE Trans. Aero. Electron. Syst., vol. 46, no. 4, pp. 1782-1796, Oct. 2010 ("conventional scheme 1"); the paper by H. Kim, Y. Lee, and S. Yoon, "A Novel Unambiguous Correlation Function for Cosine-Phased BOC Signal Tracking," J. Korean Inst. Commun. Sciences, vol. 38, no. 05, pp. 409-415, May 2013 ("conventional scheme 2"); and the paper by Y. Lee; D. Chong; I. Song; S. Y. Kim; G. I. Jee; S. Yoon, "Cancellation of Correlation Side-Peaks for Unambiguous BOC Signal Tracking," Communications Letters, IEEE, vol. 16, no. 5, pp. 569, 572, May 2012 ("conventional scheme 3").

SUMMARY

At least one embodiment of the present invention is directed to the provision of a method of generating a BOC correlation function based on partial correlation functions, an apparatus for tracking a BOC signal, and a spread spectrum signal receiver system using the same.

At least one embodiment of the present invention is directed to the provision of a method of generating a BOC correlation function based on partial correlation functions, an apparatus for tracking a BOC signal, and a spread spectrum signal receiver system using the same, which are capable of overcoming the disadvantages of conventional BOC signal tracking techniques in which the conventional BOC signal tracking techniques can eliminate only side peaks close to a main peak but cannot eliminate side peaks remote from the main peak, or can be applied only to a $BOC_{sin}(kn,n)$ signal but cannot be applied to a $BOC_{cos}(kn,n)$ signal, thereby being applicable to both $BOC_{sin}(kn,n)$ and $BOC_{cos}(kn,n)$ signals.

At least one embodiment of the present invention is directed to the provision of a method of generating a BOC correlation function based on partial correlation functions, an apparatus for tracking a BOC signal, and a spread spectrum signal receiver system using the same, which are capable of not only eliminating side peaks but also adjusting the width and height of a main peak.

At least one embodiment of the present invention is directed to the provision of a method of generating a BOC correlation function based on partial correlation functions, an apparatus for tracking a BOC signal, and a spread spectrum signal receiver system using the same, which are capable of not only eliminating side peaks but also increasing the height of a main peak while reducing the width of the main peak.

In accordance with an aspect of the present invention, there is provided a delay lock loop (DLL) for tracking a code delay phase value for a local code to be correlated with a received BOC-modulated signal in which N pulses successively occur in a single period $T_c$ of a spreading code chip in a spread spectrum signal receiver system, the DLL including a local signal generation unit configured to generate an early and late delayed received signal pair $B(t+\tau+\Delta/2)$ and $B(t+\tau-\Delta/2)$, early delayed and late delayed, respectively, based on phase delay $\tau$ and a delay value difference $\Delta$, with respect to a received signal pulse train of a received signal $B(t)$; early and late correlation units configured to generate N early partial correlation functions $S_m(\tau+\Delta/2)$ (where $0 \leq m \leq N-1$) and N late partial correlation functions $S_m(\tau-\Delta/2)$ by performing an auto-correlation operation on the early and late mixed signal pair $B(t+\tau+\Delta/2)$ and $B(t+\tau-\Delta/2)$ with respect to a total time $T(0 \leq t \leq T)$; an early combination unit configured to obtain an early intermediate correlation function $R_0(\tau+\Delta/2; a)$ by performing an elimination operation on an early sub-correlation function pair $T_1(\tau+\Delta/2; a)$ and $T_2(\tau+\Delta/2; a)$, obtained by combining first and last early partial correlation functions $S_0(\tau+\Delta/2)$ and $S_{N-1}(\tau+\Delta/2)$ based on a given main peak shape parameter a, so that only a main peak is left, and to generate an early main correlation function $R_{proposed}(\tau+\Delta/2; a)$ by superposing results obtained by additionally performing an elimination operation on the early intermediate correlation function $R_0(\tau+\Delta/2; a)$ and each of the early partial correlation functions $S_m(\tau+\Delta/2)$; a late combination unit configured to obtain a late intermediate correlation function $R_0(\tau-\Delta/2; a)$ by performing an elimination operation on a late sub-correlation function pair $T_1(\tau-\Delta/2; a)$ and $T_2(\tau-\Delta/2; a)$, obtained by combining first and last late partial correlation functions $S_0(\tau-\Delta/2)$ and $S_{N-1}(\tau-\Delta/2)$ based on a given main peak shape parameter a, so that only a main peak is left, and to generate a late main correlation function $R_{proposed}(\tau-\Delta/2; a)$ by superposing results obtained by additionally performing an elimination operation on the late intermediate correlation function $R_0(\tau-\Delta/2; a)$ and each of the late partial correlation functions $S_m(\tau-\Delta/2)$; and a numerical control oscillator (NCO) configured to determine a phase delay $\tau$ for the received signal based on a discrimination output of a discrimination function based on values of the early and late main correlation functions, and outputs the determined phase delay $\tau$ to the local signal generation unit; wherein the elimination operation is an operation related to an algebraic relation in which when real numbers x and y are $xy \leq 0$, $|x|+|y|-|x-y|=0$.

The N early partial correlation functions $S_m(\tau+\Delta/2)$ or the N late partial correlation functions $S_m(\tau-\Delta/2)$, when the received signal $B(t)$ is viewed as a sum of N partial received signals obtained by superposing an m-th ($0 \leq m \leq N-1$) pulse of N pulses present within each chip period $T_c$ on the other m-th pulses, may be obtained by performing an auto-correlation operation on each of the N partial received signals based on the following equation:

$$R(\tau) = \frac{1}{PT} \int_0^T B(t)B(t+\tau) dt$$

$$= \sum_{m=0}^{N-1} \sum_{j=0}^{T/T_c-1} \frac{1}{PT} \int_{(jN+m)}^{(jN+m+1)} B(t)B(t+\tau) dt$$

$$= \sum_{m=0}^{N-1} S_m(\tau)$$

where P is power of the received signal $B(t)$, T is a period of the pseudo noise code, $T_c$ is a chip period, and j ($0 \leq j \leq T/T_c-1$) is an index indicative of each pulse of a pulse train of an m-th partial received signal.

The early sub-correlation function pair $T_1(\tau+\Delta/2; a)$ and $T_2(\tau+\Delta/2; a)$ or the late sub-correlation function pair $T_1(\tau-\Delta/2; a)$ and $T_2(\tau-\Delta/2; a)$ may be generated such that it is symmetrical with respect to a vertical axis when the sub-correlation functions overlap each other.

The early sub-correlation function pair $T_1(\tau+\Delta/2; a)$ and $T_2(\tau+\Delta/2; a)$ or the late sub-correlation function pair $T_1(\tau-\Delta/2; a)$ and $T_2(\tau-\Delta/2; a)$ may be generated based on the following equation:

$$\begin{cases} T_1(\tau; a) = \sqrt{\frac{1}{a^2+1}} S_0(\tau) - a\sqrt{\frac{1}{a^2+1}} S_{N-1}(\tau) \\ T_2(\tau; a) = a\sqrt{\frac{1}{a^2+1}} S_0(\tau) - \sqrt{\frac{1}{a^2+1}} S_{N-1}(\tau) \end{cases}$$

The early intermediate correlation function $R_0(\tau+\Delta/2; a)$ or the late intermediate correlation function $R_0(\tau-\Delta/2; a)$ may be generated based on the following equation:

$$R_0(\tau;a) = |T_1(\tau;a)| + |T_2(\tau;a)| - |T_1(\tau;a) - T_2(\tau;a)|$$

The early main correlation function $R_{proposed}(\tau+\Delta/2; a)$ or the late main correlation function $R_{proposed}(\tau-\Delta/2; a)$ may be generated based on the following equation:

$$R_{proposed}(\tau; a) = \sum_{m=0}^{N-1} |R_0(\tau; a)| + |S_m(\tau)| - |R_0(\tau; a) - S_m(\tau)|$$

Each of the early main correlation function $R_{proposed}(\tau+\Delta/2; a)$ and the late main correlation function $R_{proposed}(\tau-\Delta/2; a)$ may be generated to have a waveform having a main peak whose height is 2 and whose base width is $$\frac{(a-\sqrt{1-a^2})}{N(a-1-\sqrt{1-a^2})} T_c$$

by performing an elimination operation on each of the early and late sub-correlation function pairs.

The discrimination function may be selected such that it can determine whether a main correlation function value based on the phase delay $\tau$ is located at the apex of the main peak based on the discrimination output.

The discrimination function $D(\tau)$ may be defined as the following equation:

$$D(\tau) = R_{proposed}^2\left(\tau + \frac{\Delta}{2}; a\right) - R_{proposed}^2\left(\tau - \frac{\Delta}{2}; a\right)$$

The code delay phase value for the local code may be determined to be the value of the phase delay $\tau$ when the zero crossing of the discrimination function $D(\tau)$ is detected.

In accordance with another aspect of the present invention, there is provided a BOC signal tracking method for tracking a code delay phase value for a local code to be correlated with a received BOC-modulated signal in which N pulses successively occur in a single period $T_c$ of a spreading code chip in a spread spectrum signal receiver system, the method including generating an early and late delayed received signal pair $B(t+\tau+\Delta/2)$ and $B(t+\tau-\Delta/2)$, early delayed and late delayed, respectively, based on phase delay $\tau$ and a delay value difference $\Delta$, with respect to a received signal pulse train of a received signal $B(t)$; generating N early partial correlation functions $S_m(\tau+\Delta/2)$ (where 0≤m≤N−1) and N late partial correlation functions $S_m(\tau-\Delta/2)$ by performing an auto-correlation operation on the early and late mixed signal pair $B(t+\tau+\Delta/2)$ and $B(t+\tau-\Delta/2)$ with respect to a total time $T(0\leq t\leq T)$; obtaining an early intermediate correlation function $R_0(\tau+\Delta/2; a)$ by performing an elimination operation on an early sub-correlation function pair $T_1(\tau+\Delta/2; a)$ and $T_2(\tau+\Delta/2; a)$, obtained by combining first and last early partial correlation functions $S_0(\tau+\Delta/2)$ and $S_{N-1}(\tau+\Delta/2)$ based on a given main peak shape parameter a, so that only a main peak is left, and generating an early main correlation function $R_{proposed}(\tau+\Delta/2; a)$ by superposing results obtained by additionally performing an elimination operation on the early intermediate correlation function $R_0(\tau+\Delta/2; a)$ and each of the early partial correlation functions $S_m(\tau+\Delta/2)$; obtaining a late intermediate correlation function $R_0(\tau-\Delta/2; a)$ by performing an elimination operation on a late sub-correlation function pair $T_1(\tau-\Delta/2; a)$ and $T_2(\tau-\Delta/2; a)$, obtained by combining first and last late partial correlation functions $S_0(\tau-\Delta/2)$ and $S_{N-1}(\tau-\Delta/2)$ based on a given main peak shape parameter a, so that only a main peak is left, and generating a late main correlation function $R_{proposed}(\tau-\Delta/2; a)$ by superposing results obtained by additionally performing an elimination operation on the late intermediate correlation function $R_0(\tau-\Delta/2; a)$ and each of the late partial correlation functions $S_m(\tau-\Delta/2)$; and determining a phase delay $\tau$ for the received signal based on a discrimination output of a discrimination function based on values of the early and late main correlation functions; wherein the elimination operation is an operation related to an algebraic relation in which when real numbers x and y are xy≤0, |x|+|y|−|x−y|=0.

The N early partial correlation functions $S_m(\tau+\Delta/2)$ or the N late partial correlation functions $S_m(\tau-\Delta/2)$, when the received signal $B(t)$ is viewed as a sum of N partial received signals obtained by superposing an m-th (0≤m≤N−1) pulse of N pulses present within each chip period $T_c$ on the other m-th pulses, may be obtained by performing an auto-correlation operation on each of the N partial received signals based on the following equation:

$$R(\tau) = \frac{1}{PT}\int_0^T B(t)B(t+\tau)\,dt$$

$$= \sum_{m=0}^{N-1}\sum_{j=0}^{T/T_c-1} \frac{1}{PT}\int_{(jN+m)}^{(jN+m+1)} B(t)B(t+\tau)\,dt$$

$$= \sum_{m=0}^{N-1} S_m(\tau)$$

where P is power of the received signal $B(t)$, T is a period of the pseudo noise code, $T_c$ is a chip period, and j (0≤j≤T/$T_c$−1) is an index indicative of each pulse of a pulse train of an m-th partial received signal.

The early sub-correlation function pair $T_1(\tau+\Delta/2; a)$ and $T_2(\tau+\Delta/2; a)$ or the late sub-correlation function pair $T_1(\tau-\Delta/2; a)$ and $T_2(\tau-\Delta/2; a)$ may be generated such that it is symmetrical with respect to a vertical axis when the sub-correlation functions overlap each other.

The early sub-correlation function pair $T_1(\tau+\Delta/2; a)$ and $T_2(\tau+\Delta/2; a)$ or the late sub-correlation function pair $T_1(\tau-\Delta/2; a)$ and $T_2(\tau-\Delta/2; a)$ may be generated based on the following equation:

$$\begin{cases} T_1(\tau; a) = \sqrt{\dfrac{1}{a^2+1}}\, S_0(\tau) - a\sqrt{\dfrac{1}{a^2+1}}\, S_{N-1}(\tau) \\ T_2(\tau; a) = a\sqrt{\dfrac{1}{a^2+1}}\, S_0(\tau) - \sqrt{\dfrac{1}{a^2+1}}\, S_{N-1}(\tau) \end{cases},$$

The early intermediate correlation function $R_0(\tau+\Delta/2; a)$ or the late intermediate correlation function $R_0(\tau-\Delta/2; a)$ may be generated based on the following equation:

$$R_0(\tau;a) = |T_1(\tau;a)| + |T_2(\tau;a)| - |T_1(\tau;a) - T_2(\tau;a)|$$

The early main correlation function $R_{proposed}(\tau+\Delta/2; a)$ or the late main correlation function $R_{proposed}(\tau-\Delta/2; a)$ may be generated based on the following equation:

$$R_{proposed}(\tau; a) = \sum_{m=0}^{N-1} |R_0(\tau; a)| + |S_m(\tau)| - |R_0(\tau; a) - S_m(\tau)|$$

Each of the early main correlation function $R_{proposed}(\tau+\Delta/2; a)$ and the late main correlation function $R_{proposed}(\tau-\Delta/2; a)$ may be generated to have a waveform having a main peak whose height is 2 and whose base width is $$\frac{(a - \sqrt{1-a^2})}{N(a - 1 - \sqrt{1-a^2})} T_c$$

by performing an elimination operation on each of the early and late sub-correlation function pairs.

The discrimination function may be selected such that it can determine whether a main correlation function value based on the phase delay $\tau$ is located at the apex of the main peak based on the discrimination output.

The discrimination function $D(\tau)$ may be defined as the following equation:

$$D(\tau) = R_{proposed}^2\left(\tau + \frac{\Delta}{2}; a\right) - R_{proposed}^2\left(\tau - \frac{\Delta}{2}; a\right)$$

The code delay phase value for the local code may be determined to be a value of the phase delay $\tau$ when the zero crossing of the discrimination function $D(\tau)$ is detected.

In accordance with still another aspect of the present invention, there is provided a method for generating a correlation function used to track a code delay phase value for a local code to be correlated with a received BOC-modulated signal in which N pulses successively occur in a single period $T_c$ of a spreading code chip in a spread spectrum signal receiver system, the method including generating a delayed received signal $B(t+\tau)$ based on phase delay $\tau$ with respect to a received signal pulse train of a received signal $B(t)$; generating N partial correlation functions $S_m(\tau)$ (where $0 \leq m \leq N-1$) by performing an auto-correlation operation on the received signal $B(t)$ and the delayed received signal $B(t+\tau)$ with respect to a total time $T(0 \leq t \leq T)$; and obtaining an intermediate correlation function $R_0(\tau; a)$ by performing an elimination operation on a sub-correlation function pair $T_1(\tau; a)$ and $T_2(\tau; a)$, obtained by combining first and last partial correlation functions $S_0(\tau)$ and $S_{N-1}(\tau)$ based on a given main peak shape parameter a, so that only a main peak is left, and generating a main correlation function $R_{proposed}(\tau; a)$ by superposing results obtained by additionally performing an elimination operation on the intermediate correlation function $R_0(\tau; a)$ and each of the partial correlation functions $S_m(\tau)$; wherein the elimination operation is an operation related to an algebraic relation in which when real numbers x and y are $xy \leq 0$, $|x|+|y|-|x-y|=0$.

The N partial correlation functions $S_m(\tau)$, when the received signal $B(t)$ is viewed as a sum of N partial received signals obtained by superposing an m-th ($0 \leq m \leq N-1$) pulse of N pulses present within each chip period $T_c$ on the other m-th pulses, may be obtained by performing an auto-correlation operation on each of the N partial received signals based on the following equation:

$$R(\tau) = \frac{1}{PT} \int_0^T B(t)B(t+\tau)\,dt$$

$$= \sum_{m=0}^{N-1} \sum_{j=0}^{T/T_c-1} \frac{1}{PT} \int_{(jN+m)}^{(jN+m+1)} B(t)B(t+\tau)\,dt$$

$$= \sum_{m=0}^{N-1} S_m(\tau)$$

where P is power of the received signal $B(t)$, T is a period of the pseudo noise code, $T_c$ is a chip period, and j ($0 \leq j \leq T/T_c-1$) is an index indicative of each pulse of a pulse train of an m-th partial received signal.

The sub-correlation function pair $T_1(\tau; a)$ and $T_2(\tau; a)$ may be generated such that a waveform in the positive range $\tau>0$ of the first sub-correlation function $T_1(\tau; a)$ is symmetrical to a waveform in the negative range $\tau<0$ of the second sub-correlation function $T_2(\tau; a)$ with respect to a vertical axis and a waveform in the negative range $\tau<0$ of the first sub-correlation function $T_1(\tau; a)$ is symmetrical to a waveform in the positive range $\tau>0$ of the second sub-correlation function $T_2(\tau; a)$ with respect to a vertical axis.

The sub-correlation function pair $T_1(\tau; a)$ and $T_2(\tau; a)$ may be generated based on the following equation:

$$\begin{cases} T_1(\tau; a) = \sqrt{\dfrac{1}{a^2+1}}\, S_0(\tau) - a\sqrt{\dfrac{1}{a^2+1}}\, S_{N-1}(\tau) \\ T_2(\tau; a) = a\sqrt{\dfrac{1}{a^2+1}}\, S_0(\tau) - \sqrt{\dfrac{1}{a^2+1}}\, S_{N-1}(\tau) \end{cases}$$

The intermediate correlation function $R_0(\tau; a)$ may be generated based on the following equation:

$$R_0(\tau;a) = |T_1(\tau;a)| + |T_2(\tau;a)| - |T_1(\tau;a) - T_2(\tau;a)|$$

The main correlation function $R_{proposed}(\tau; a)$ may be generated based on the following equation:

$$R_{proposed}(\tau; a) = \sum_{m=0}^{N-1} |R_0(\tau; a)| + |S_m(\tau)| - |R_0(\tau; a) - S_m(\tau)|$$

The main correlation function $R_{proposed}(\tau; a)$ may be generated to have a waveform having a main peak whose height is 2 and whose base width is $$\frac{(a - \sqrt{1-a^2})}{N(a - 1 - \sqrt{1-a^2})} T_c$$

by superposing the peaks of $|R_0(\tau; a)|+|S_m(\tau)|-|R_0(\tau; a)-S_m(\tau)|$ each having a height of 2/N and a width of $$\frac{(a - \sqrt{1-a^2})}{N(a - 1 - \sqrt{1-a^2})} T_c$$

with respect to a that satisfies $R_0(\tau; a)>S_m(\tau)$.

The main correlation function $R_{proposed}(\tau; a)$ may have a waveform obtained by subtracting a waveform of an absolute value of a sum of $T_1(\tau; a)$ and $T_2(\tau; a)$ from a waveform of a sum of absolute values of $T_1(\tau; a)$ and $T_2(\tau; a)$.

In accordance with still another aspect of the present invention, there is provided an apparatus for tracking a BOC signal, including a frequency offset compensation unit configured to output a compensated received signal compensated for frequency offset of a carrier frequency based on a carrier frequency compensation value with respect to a received signal obtained by BOC-modulating predetermined data; a local code generation unit configured to generate a delay-compensated local code based on a code delay value; a mixer configured to mix the delay-compensated local code with the frequency offset-compensated received signal; a DLL configured to repeatedly track and calculate a code delay value that allows a correlation value obtained by correlating the delay-compensated local signal and the frequency offset-compensated received signal with each other is located at the apex of the main peak of a correlation function, and to provide the calculated code delay value to the local code generation unit; a phase lock loop (PLL) configured to repeatedly calculate a carrier frequency compensation value based on the auto-correlation value of a local code, based on the tracked code delay value, so that the phase error of a carrier signal can be minimized, and to provide the carrier frequency compensation value to the frequency offset compensation unit; and a data extraction unit configured to extract spreading data from a mixture of the delay-compensated local code and the compensated received signal; wherein the DLL operates to generate a delayed received signal $B(t+\tau)$ based on phase delay $\tau$ with respect to a received signal pulse train of a received signal $B(t)$; generate N partial correlation functions $S_m(\tau)$ (where $0 \leq m \leq N-1$) by performing an auto-correlation operation on the received signal $B(t)$ and the delayed received signal $B(t+\tau)$ with respect to the total time $T(0 \leq t \leq T)$; and obtain an intermediate correlation function $R_0(\tau; a)$ by performing an elimination operation on a sub-correlation function pair $T_1(\tau; a)$ and $T_1(\tau; a)$, obtained by combining first and last partial correlation functions $S_0(\tau)$ and $S_{N-1}(\tau)$ based on a given main peak shape parameter a, so that only a main peak is left, and generate a main correlation function $R_{proposed}(\tau; a)$ by superposing results obtained by additionally performing an elimination operation on the intermediate correlation function $R_0(\tau; a)$ and each of the partial correlation functions $S_m(\tau)$; wherein the elimination operation is an operation related to an algebraic relation in which when real numbers x and y are xy≤0, |x|+|y|−|x−y|=0.

The received BOC signal may contain satellite navigation data; and the data extraction unit may operate to extract the satellite navigation data and estimate a pseudorange based on the extracted navigation data.

In accordance with still another aspect of the present invention, there is provided a spread spectrum signal receiver system, including a front end unit configured to output a digital received signal obtained by BOC-modulating a space wireless signal received from an antenna; a baseband processing unit configured to acquire and track a code delay value for the output digital received signal using a DLL, to compensate for carrier frequency offset using a PLL, and to extract the contained data from a code delay-compensated local code and a frequency offset-compensated received signal; and an application processing unit configured to perform a predetermined application function based on the extracted contained data; wherein the baseband processing unit operates to generate a delayed received signal $B(t+\tau)$ based on phase delay τ with respect to a received signal pulse train of the received signal $B(t)$; generate N partial correlation functions $S_m(\tau)$ (where 0≤m≤N−1) by performing an auto-correlation operation on the received signal $B(t)$ and the delayed received signal $B(t+\tau)$ with respect to a total time T(0≤t≤T); obtain an intermediate correlation function $R_0(\tau; a)$ by performing an elimination operation on a sub-correlation function pair $T_1(\tau; a)$ and $T_2(\tau; a)$, obtained by combining first and last partial correlation functions $S_0(\tau)$ and $S_{N-1}(\tau)$ based on a given main peak shape parameter a, so that only a main peak is left, and generate a main correlation function $R_{proposed}(\tau; a)$ by superposing results obtained by additionally performing an elimination operation on the intermediate correlation function $R_0(\tau; a)$ and each of the partial correlation functions $S_m(\tau)$; and acquire and track a code delay value from phase delay τ based on the generated main correlation function; wherein the elimination operation is an operation related to an algebraic relation in which when real numbers x and y are xy≤0, |x|+|y|−|x−y|=0.

The spread spectrum signal receiver system may be a satellite navigation signal receiver system; the baseband processing unit may operate to extract a pseudorange from each of a plurality of satellites to a satellite navigation signal receiver system from the contained data; and the application processing unit may operate to calculate the coordinates of the satellite navigation signal receiver system based on the pseudoranges provided with respect to the plurality of satellites.

BRIEF DESCRIPTION OF THE DRAWINGS

The above and other objects, features and advantages of the present invention will be more clearly understood from the following detailed description taken in conjunction with the accompanying drawings, in which:

FIG. 1 is a block diagram illustrating a spread spectrum signal receiver system according to an embodiment of the present invention;

FIG. 2 is a block diagram illustrating an apparatus for tracking a BOC signal according to an embodiment of the present invention;

FIG. 3 is a block diagram illustrating the DLL of an apparatus for tracking a BOC signal according to an embodiment of the present invention;

FIG. 4 illustrates partial correlation functions constituting the auto-correlation function of a received BOC signal for an apparatus for tracking a BOC signal according to an embodiment of the present invention;

FIG. 5 is a diagram illustrating a sub-correlation function pair that is obtained by combining some of partial correlation functions, for example, first and last partial correlation functions, constituting the auto-correlation function of a received BOC signal for an apparatus for tracking a BOC signal according to an embodiment of the present invention;

FIG. 6 is a diagram illustrating an intermediate correlation function in which only a main peak has been left by the performance of an elimination operation on sub-correlation functions in an apparatus for tracking a BOC signal according to an embodiment of the present invention;

FIG. 7 is a diagram illustrating a process of obtaining a main correlation function having a superposed main peak as the sum of the results of the performance of an elimination operation on partial correlation functions constituting the auto-correlation function of a received signal and an intermediate correlation function in an apparatus for tracking a BOC signal according to an embodiment of the present invention;

FIGS. 8 and 9 are diagrams illustrating main correlation functions in which only a main peak has been left for an apparatus for tracking a BOC signal according to an embodiment of the present invention;

FIG. 10 is a flowchart illustrating a method of tracking a BOC signal according to another embodiment of the present invention; and FIGS. 11 and 12 are graphs illustrating the performance of an apparatus and method for tracking a BOC signal according to embodiments of the present invention.

DETAILED DESCRIPTION

With regard to embodiments of the present invention disclosed herein, specific structural and functional descriptions are given merely for the purpose of illustrating the embodiments of the present invention. Embodiments of the present invention may be practiced in various forms, and the present invention should not be construed as being limited to embodiments disclosed herein.

Embodiments of the present invention will be described in detail below with reference to the accompanying drawings. The same reference numerals will be used to denote the same components throughout the accompanying drawings, and descriptions of the same components will be omitted.

FIG. 1 is a block diagram illustrating a spread spectrum signal receiver system 10 according to an embodiment of the present invention.

Referring to FIG. 1, the spread spectrum signal receiver system 10 includes an antenna, a front end unit 11, a baseband processing unit 12, and an application processing unit 13.

A signal in space (SIS) received by the antenna is subjected to tuning, down conversion, filtering, amplification, and digital sampling by the front end unit 11, and is then output as a digital received signal.

The baseband processing unit 12 acquires and tracks code delay using a delay lock loop (DLL) for acquiring and tracking signal synchronization based on a signal correlation technique with respect to the output digital received signal, compensates for carrier frequency offset using a phase lock loop (PLL) in order to compensate for the fading or Doppler effect, and extracts synchronized data from a code delay-compensated local signal and a frequency offset-compensated received signal.

In particular, if the digital received signal on which synchronization data is carried is a satellite navigation signal received from a navigation satellite and synchronization data is satellite navigation data, the baseband processing unit 12 may additionally generate the pseudorange from a satellite to the spread spectrum signal receiver system 10 based on the satellite navigation data, and may output the pseudorange.

Furthermore, the baseband processing unit 12 may extract phase measurement data, satellite location data (almanac), satellite clock information, satellite orbit data (ephemeris), etc. from the compensated received signal, in addition to the pseudorange.

In this case, as will be described later, the baseband processing unit 12 of the spread spectrum signal receiver system 10 according to the present embodiment may eliminate side peaks and generate an intermediate correlation function having only a main peak using two sub-correlation functions generated by combining some of partial correlation functions constituting the auto-correlation function of a received spread spectrum signal, and may accurately acquire and track code delay based on a main correlation function having only a main peak synthesized by the performance of the elimination operation on and the combination of the generated intermediate correlation function and the partial correlation functions.

The application processing unit 13 may perform a specific predetermined application function in accordance with the purpose of the spread spectrum signal receiver system 10.

As an example, when the spread spectrum signal receiver system 10 is a disaster broadcast signal receiver system, the application processing unit 13 may extract disaster alarm broadcast data from extracted synchronized data and provide an appropriate disaster alarm to a user.

As another example, when the spread spectrum signal receiver system 10 is a satellite navigation signal receiver system, the application processing unit 13 may calculate the coordinates and movement of the receiver system 10 based on pseudoranges provided in connection with a plurality of satellites.

In this case, for example, the application processing unit 13 may calculate the 2D coordinates of the receiver system 10 from the pseudoranges obtained for three satellites, and may calculate 3D coordinates from the pseudoranges obtained for at least four satellites.

FIG. 2 is a block diagram illustrating an apparatus for tracking a BOC signal according to an embodiment of the present invention.

The baseband processing unit 12 of the spread spectrum signal receiver system 10 of FIG. 1 may acquire and track code delay using circuits, such as an apparatus for tracking a BOC signal 20 illustrated in FIG. 2.

Referring to FIG. 2, the apparatus 20 for tracking a BOC signal may include a frequency offset compensation unit 21, a local code generation unit 22, a mixer 23, a DLL 24, a PLL 25, and a data extraction unit 26.

When the apparatus 20 for tracking a BOC signal receives a BOC modulated spread spectrum signal, for example, it takes time for a spread spectrum signal modulated into a PRN code in a navigation satellite to reach the receiver system 10, and carrier frequency offset occurs during the travel of the signal due to the fading or Doppler effect. Accordingly, in order to accurately track and demodulate the BOC modulated spread spectrum signal, a code delay value and carrier frequency offset should be known.

Since it is impossible to know a code delay value and a frequency offset value or they should be inaccurately estimated when a spread spectrum signal is received first, the code delay value should be determined or a carrier frequency should be compensated via the DLL 24 or PLL 25.

First, the frequency offset compensation unit 21 outputs a compensated received signal obtained by compensating the BOC modulated spread spectrum signal for carrier frequency fading or frequency offset attributable to the Doppler effect based on a carrier frequency compensation value provided by the PLL 25. Since there is no information used to compensate for calculated carrier frequency offset in the beginning stage, a default value or a previous estimated value may be applied.

The local code generation unit 22 generates a delay-compensated local code based on a code delay value that is calculated by the DLL 24. Since there is no calculated code delay value in the beginning stage, a default value or a previous estimated value may be applied.

The mixer 23 mixes the delay-compensated local code and the frequency deviation-compensated compensated received signal.

The DLL 24 repeatedly tracks and calculates a code delay value that allows a correlation value, obtained by performing a predetermined correlation operation on the delayed received signal based on the compensated received signal and a predetermined code delay value, to be located at the main peak of a main correlation function, and provides the calculated code delay value to the local code generation unit 22.

More specifically, as will be described in detail later, the DLL 24 may obtain sub-correlation functions by combining some of partial correlation functions constituting the auto-correlation function of the received signal, may obtain an intermediate correlation function by performing a predetermined elimination operation on the sub-correlation functions, and may obtain a main correlation function having a superposed main peak by summing results obtained by performing an elimination operation on each of the partial correlation functions constituting the auto-correlation function of the received signal and the intermediate correlation function.

In this case, as will be described in connection with Equation 5, throughout the present specification and the attached claims, an elimination operation refers to an operation related to algebraic relations in which $|x|+|y|-|x-y|=0$ if real numbers x and y are $xy \le 0$ and in which $|x|+|y|-|x-y|>0$ if the real numbers x and y are $xy>0$.

The main correlation function according to the present invention may eliminate all side peaks, other than a main peak, and adjust the shape of the main peak, particularly the slope of the peak that determines tracking performance, thereby being able to improve tracking performance.

The PLL 25 repeatedly compensates a carrier frequency based on the auto-correlation value of the local code, based on the tracked code delay value, so that the phase error of a carrier signal can be minimized, and then provides a carrier frequency compensation value to the frequency offset compensation unit 21.

After the compensated received signal has been appropriately acquired and tracked, the data extraction unit 26 may accurately extract synchronized data, such as satellite navigation data modulated into a PRN code on a satellite side, from a mixture of the delay-compensated local code and the frequency deviation-compensated received signal.

Furthermore, the data extraction unit 26 may estimate the pseudorange to the satellite based on the extracted satellite navigation data.

FIG. 3 is a block diagram illustrating the DLL 24 of an apparatus for tracking a BOC signal according to an embodiment of the present invention.

More specifically, the DLL 24 includes a local signal generation unit 31, early and late mixers 32a and 32b, early and late correlation units 33a and 33b, early and late combination units 34a and 34b, a discriminator mixer 35, a loop filter 36, and a numerical control oscillator (NCO) 37.

A conventional apparatus for tracking a BOC signal outputs a priori known spreading code via a local signal generation unit and then performs a correlation operation on the spreading code and a received signal in order to acquire the spreading code of a BOC signal and its synchronization, and performs auto-correlation on the received signal and then finds a pseudo random noise code and a code delay phase for which a correlation value exhibits the highest main peak in order to track code delay after the acquisition.

That is, the conventional apparatus for tracking a BOC signal outputs a priori known spreading code via the local signal generation unit, performs a correlation operation on the spreading code and a received signal and then acquire a spreading code of a BOC signal and its synchronization at the step of acquiring the spreading code and its synchronization, and outputs the delayed received signal via a local code generation unit, performs auto-correlation on the received signal, and then finds a code delay phase that exhibits a main peak having the largest correlation value at the step of tracking code delay after the acquisition.

As described above, the auto-correlation function of a BOC signal has a plurality of side peaks. In order to overcome this problem, the early and late combination units 34a and 34b according to the present embodiment may obtain sub-correlation functions by combining some of partial correlation functions constituting the auto-correlation function of the received signal, may obtain an intermediate correlation function by performing a predetermined elimination operation on the sub-correlation functions, and may provide a main correlation function having a superposed main peak by superposing results obtained by performing an elimination operation on each of the partial correlation functions constituting the auto-correlation function of the received signal and the intermediate correlation function.

In this case, the auto-correlation operation refers to an operation that multiplies a sampled signal X(t+τ) by a signal X(t) while gradually changing the delay time τ of the signal X(t) with respect to the signal X(t). Generally, when the signal X(t) repeats a specific pattern, the auto-correlation value of the signals X(t) and the X(t+τ) appears to be considerably large if the delay time τ is equal to the period of the pattern and appears to be small (that is, the correlation function appears in the form of a peak) if the delay time τ is not equal to the period of the pattern. Accordingly, when time delay for which the result of the auto-correlation operation appears to be largest is found, the value of the found time delay is the period of the signal X(t).

If a signal X(t) is a preamble indicative of the start of a synchronized signal, signal synchronization may be coarsely acquired using an auto-correlation operation.

Furthermore, after the signal synchronization has been acquired, signal synchronization may be finely tracked via an auto-correlation operation.

In general, there are some techniques for tracking the apex of the peak of a correlation function. For example, there is a technique using the aspect of changes in the values of prompt correlation based on currently applied delay time, early correlation preceding the prompt correlation, and late correlation following the prompt correlation.

For example, if correlation values appear in order of early correlation, prompt correlation and late correlation or in reverse order, the prompt correlation may be viewed as being located on a slope of a peak. If the correlation value of prompt correlation is highest and the values of early correlation and late correlation are lower than the former value, this means that the prompt correlation is located near the apex of a peak.

Generally, if received BOC-modulated signals, that is, $BOC_{sin}(kn,n)$ and $BOC_{cos}(kn,n)$ signals, are B(t), B(t) may be expressed as follows:

$$B(t) = \sqrt{P} \sum_{i=-\infty}^{\infty} b_i r_{T_c}(t - iT_c) d_i(t) c_i(t) \quad (1)$$

where P is the power of a BOC-modulated signal, $b_i \in \{-1, 1\}$ is the i-th chip of a spreading code having a period T, for example, a PRN code, $T_c$ is the chip period of the spreading code, $r_{T_c}(t)$ is a unit square wave present in $[0, T_c]$, $d_i(t)$ is navigation data, and $c_i(t)$ is an i-th sub-carrier for BOC modulation.

In this case, it should be noted that for ease of description, the following description will be given on the assumption that d(t)=1 where significant data is not substantially present, based on the fact that a satellite navigation system does not generally provide a separate pilot channel for synchronization.

$c_i(t)$ is the i-th sub-carrier, and may be expressed as the following Equation 2 because N square pulses are present in a single chip of the PRN code:

$$c_i(t) = \sum_{m=0}^{N-1} e_m r_{T_s}(t - iT_c - mT_s)$$

$$= \sum_{m=0}^{N-1} c_m(t)$$

where $e_m \in \{-1, 1\}$ is the sign of an m-th square pulse, and $T_s$ is $T_c/N$ and the period of the square pulse.

In a $BOC_{sin}(kn,n)$ signal, for the i-th sub-carrier $c_i(t)$, N and $e_m$ are 2k and $(-1)^{2ki+1}$, respectively. That is, in the $BOC_{sin}(kn,n)$ signal, the i-th sub-carrier $c_i(t)$ may be considered to be equal to a pulse train in which 2k pulses, the sign of each of which is determined to be $(-1)^{2ki+1}$, successively occur, and then the following procedure may be performed. $T_s$ is $1/(2kn*1.023 \text{ MHz})$.

In a $BOC_{cos}(kn,n)$ signal, for the i-th sub-carrier $c_i(t)$, N and $e_m$ are 4k and $$(-1)^{2ki+1\lceil \frac{m}{2} \rceil},$$

respectively. In this case, ⌈x⌉ is a ceiling function, and is the largest integer that is not smaller than x. $T_s$ is 1/(4kn*1.023 MHz).

If a definition is given as $c_m(t)=e_m r_{Ts}(t-iT_c-lT_s)$, each of the pulses constituting $c_i(t)$ may be represented as $c_m(t)$.

In general, in a correlation function obtained by correlating the BOC-modulated received signal B(t) with the PRN code, a plurality of side peaks appears in a main peak in the form of sawteeth, and thus a problem arises in that acquisition and tracking occur in connection with any one of the side peaks instead of the main peak, which is called the ambiguity problem.

In the present invention, in order to overcome the ambiguity problem, a correlation function in which a main peak has been left and side peaks have been eliminated is generated. For this purpose, an auto-correlation operation is performed on the received signal B(t) first.

FIG. 4 illustrates partial correlation functions constituting the auto-correlation function of a received BOC signal for an apparatus for tracking a BOC signal according to an embodiment of the present invention.

First, the normalized auto-correlation function R(τ) of the received BOC signal may be expressed as the superposition of N partial correlation functions $S_m(\tau)$, as given by the following Equation 3:

$$R(\tau) = \frac{1}{PT}\int_0^T B(t)B(t+\tau)\,dt \qquad (3)$$
$$= \sum_{m=0}^{N-1}\sum_{j=0}^{T/T_c-1} \frac{1}{PT}\int_{(jN+m)}^{(jN+m+1)} B(t)B(t+\tau)\,dt$$
$$= \sum_{m=0}^{N-1} S_m(\tau)$$

where P is the power of the received signal B(t), and T is the period of the pseudo noise code. It is assumed that the sign +1 or −1 appears with the same probability distribution in the chip of the pseudo noise code, and the period T of the pseudo noise code may be viewed as being considerably longer than the chip period $T_c$.

Accordingly, the received signal B(t) may be viewed as the sum of N partial received signals that are obtained by superposing the m-th (0≤m≤N−1) pulse of N pulses present within each chip period $T_c$ on the other m-th pulses. The pulse train of a single partial received signal is composed of a number of pulses equal to the number of chips $T/T_c$ included in the received signal, and each pulse of the pulse train of the m-th partial received signal is expressed as j(0≤j≤T/$T_c$−1) in Equation 3.

In other words, a first partial received signal is a T/$T_c$-long pulse train composed of pulses at the first (m=0) pulse locations of respective chips, and a second partial received signal is a T/$T_c$-long pulse train composed of pulses at the second (m=1) pulse locations of the respective chips. An N-th partial received signal, that is, a last partial received signal, is a T/$T_c$-long pulse train composed of pulses at the last (m=N−1 pulse locations of the respective chips.

Accordingly, the auto-correlation function R(τ) may be represented as the superposition of the auto-correlation functions of partial received signals composed of pulses at respective pulse locations of the received signal B(t), that is, N partial correlation functions. In Equation 3, $S_m(\tau)$ is the m-th partial correlation function of the N partial correlation functions.

In FIG. 4, individual partial correlation functions $S_m(\tau)$ for a general $BOC_{sin}$(kn,n) signal have a form in which N sawtooth-shaped peaks successively occur. From FIG. 4, it can be seen that as the value of m increases, a location where a peak component starts to appear and a location where a peak component disappears tend to gradually move to the left.

In this case, it can be seen that in the case of the first partial correlation function $S_0(\tau)$ of the N partial correlation functions, peak components are present at the center and on the right side and a side peak component is not present on the left side and, in the case of the last partial correlation function $S_{N-1}(\tau)$ thereof, a peak component is not present at the center and on the left side and a side peak component is not present on the right side.

Therefore, when the first partial correlation function $S_0(\tau)$ and the last partial correlation function $S_{N-1}(\tau)$ are combined with each other, a specific correlation function in which side peaks are eliminated and only a main peak is left may be obtained. However, the width and size of the main peak of the correlation function obtained by such combination itself are fixed, the usefulness thereof is low, and thus it is not used in the present invention.

Instead, in order to adjust the width and size of the main peak, the inventor of the present invention has devised a new sub-correlation function pair $T_1(\tau; a)$ and $T_2(\tau; a)$ that are obtained by multiplying each of the first partial correlation function $S_0(\tau)$ and the last partial correlation function $S_{N-1}(\tau)$ by any one of a first scaling weight $$\sqrt{\frac{1}{a^2+1}}$$

or a second scaling weight $$a\sqrt{\frac{1}{a^2+1}}$$

based on a main peak shape parameter a and then a +1 subtracting multiplication results from each other, as given as the following Equation 4:

$$\begin{cases} T_1(\tau;a) = \sqrt{\dfrac{1}{a^2+1}}\,S_0(\tau) - a\sqrt{\dfrac{1}{a^2+1}}\,S_{N-1}(\tau) \\ T_2(\tau;a) = a\sqrt{\dfrac{1}{a^2+1}}\,S_0(\tau) - a\sqrt{\dfrac{1}{a^2+1}}\,S_{N-1}(\tau) \end{cases} \qquad (4)$$

Since such a sub-correlation function pair $T_1(\tau; a)$ and $T_2(\tau; a)$ exhibits a form in which the sub-correlation functions are symmetrical with respect to a vertical axis when they are made to overlap each other, side peaks may be eliminated and only a main peak may be left when an elimination operation is performed on the sub-correlation function pair.

More specifically, in the sub-correlation function pair $T_1(\tau; a)$ and $T_2(\tau; a)$, a waveform in the positive range (τ>0) of the first sub-correlation function $T_1(\tau; a)$ and a waveform in the negative range (τ<0) of the second sub-correlation function $T_2(\tau; a)$ are symmetrical to each other with respect to a vertical axis, and a waveform in the negative range (τ<0)

of the first sub-correlation function $T_1(\tau; a)$ and a waveform in the positive range ($\tau>0$) of the second sub-correlation function $T_2(\tau; a)$ are symmetrical to each other with respect to a vertical axis.

Referring to FIG. 5 in order to illustrate the example shape of a sub-correlation function pair $T_1(\tau; a)$ and $T_2(\tau; a)$, FIG. 5 is a diagram illustrating a sub-correlation function pair that is obtained by combining some of partial correlation functions, for example, first and last partial correlation functions, constituting the auto-correlation function of a received BOC signal for an apparatus for tracking a BOC signal according to an embodiment of the present invention.

In FIG. 5, if the received signal B(t) is a $BOC_{sin}(kn,n)$, each function of the sub-correlation function pair $T_1(\tau; a)$ and $T_2(\tau; a)$ exhibits a sawtooth-shaped waveform having a plurality of peaks. In particular, zero crossing occurs at $$\frac{(a-\sqrt{1-a^2})}{N(a-1-\sqrt{1-a^2})}T_c$$

in the central peak of the sub-correlation function $T_1(\tau; a)$, and zero crossing occurs at $$\frac{(a-\sqrt{1-a^2})}{N(a-1-\sqrt{1-a^2})}T_c$$

in the central peak of the sub-correlation function $T_2(\tau; a)$.

Similarly, if the received signal B(t) is a $BOC_{cos}(kn,n)$, each function of the sub-correlation function pair $T_1(\tau; a)$ and $T_2(\tau; a)$ exhibits a sawtooth-shaped waveform having truncated peaks in addition to a central main peak. Similarly, zero crossing occurs at $$\frac{(a-\sqrt{1-a^2})}{N(a-1-\sqrt{1-a^2})}T_c$$

in the central peak of the sub-correlation function $T_1(\tau; a)$, and zero crossing occurs at $$\frac{(a-\sqrt{1-a^2})}{N(a-1-\sqrt{1-a^2})}T_c$$

in the central peak of the sub-correlation function $T_2(\tau; a)$.

The remaining waveforms other than central peak segments to be left as a main peak may be eliminated by the performance of an elimination operation on the sub-correlation function pair $T_1(\tau; a)$ and $T_2(\tau; a)$ using algebraic relations in which the sub-correlation function pair $T_2(\tau; a)$ and $T_2(\tau; a)$ satisfy $T_1(\tau; a) \times T_2(\tau; a)$ in the range from a vertical axis, that is, the candidate location of a main peak, to a location where zero crossing occurs, $|x|+|y|-|x-y|>0$ if real numbers x and y are $xy>0$, and $|x|+|y|-|x-y|=0$ if $xy\leq 0$.

When a correlation function in which only a main peak has been left and side waveforms have been eliminated by performing the elimination operation on the sub-correlation function pair is referred to as an intermediate correlation function, the intermediate correlation function $R_0(\tau; a)$ may be given as the following Equation 5:

$$R_0(\tau;a)=|T_1(\tau;a)|+|T_2(\tau;a)|-|T_1(\tau;a)-T_2(\tau;a)| \quad (5)$$

Referring to FIG. 6 in order to illustrate the waveform of the intermediate correlation function $R_0(\tau; a)$ according to Equation 5, FIG. 6 is a diagram illustrating an intermediate correlation function in which only a main peak has been left by the performance of an elimination operation on sub-correlation functions in an apparatus for tracking a BOC signal according to an embodiment of the present invention.

In FIG. 6, the intermediate correlation function $R_0(\tau; a)$ according to Equation 5 is useful as a correlation function for BOC signal tracking because the intermediate correlation function $R_0(\tau; a)$ itself has a waveform having only a main peak. It may be said that the performance of BOC signal tracking generally becomes better in proportion to the sharpness of the main peak of a correlation function in terms of various aspects. In other words, the absolute value of the slope of the inclined portion of a peak is very important to the improvement of tracking performance.

Since the intermediate correlation function $R_0(\tau; a)$ has a main peak having a height of $$\frac{(2(1-a)}{N\sqrt{a^2+1})}$$

and a width of $$\frac{(a-\sqrt{1-a^2})}{N(a-1-\sqrt{1-a^2})}T_c,$$

both the width and the height decrease as a increases, and thus it is difficult to increase the absolute value of the slope.

Meanwhile, when only the height of the main peak is increased by simply scaling the intermediate correlation function $R_0(\tau; a)$, a noise component is also increased, with the result that the sharpening of the main peak is not advantageous to the improvement of performance.

Accordingly, the present invention proposes a final main correlation function $R_{proposed}(\tau; a)$ in which the height of a main peak is not decreased when the width thereof is decreased, as given as the following Equation 6:

$$R_{proposed}(\tau; a) = \sum_{m=0}^{N-1} |R_0(\tau;a)| + |S_m(\tau)| - |R_0(\tau;a) - S_m(\tau)| \quad (6)$$

According to Equation 6, the main correlation function $R_{proposed}(\tau; a)$ is defined as a waveform that is obtained by superposing results obtained by the additional performance of an elimination operation on each of the intermediate correlation function $R_0(\tau; a)$ and the partial correlation functions $S_m(\tau)$.

In other words, an elimination operation, that is, an algebraic relation in which if real numbers x and y are $xy \leq 0$, $|x|+|y|-|x-y|=0$, is used. Accordingly, the waveforms in the range of $R_0(\tau; a) \times S_m(\tau) > 0$ are not eliminated but are left, and the main correlation function $R_{proposed}(\tau; a)$ is obtained by superposing the left waveforms.

The main correlation function $R_{proposed}(\tau; a)$ can improve the performance of signal tracking without increasing a noise component via a procedure, such as that of Equation 6, compared to the intermediate correlation function $R_0(\tau; a)$.

Referring to FIG. 7 in order to illustrate a process of obtaining a main correlation function $R_{proposed}(\tau; a)$, FIG. 7 is a diagram illustrating a process of obtaining a main correlation function having a superposed main peak as the sum of the results of the performance of an elimination operation on partial correlation functions constituting the auto-correlation function of a received signal and an intermediate correlation function in an apparatus for tracking a BOC signal according to an embodiment of the present invention.

In FIG. 7, the range of $R_0(\tau; a) \times S_m(\tau) \leq 0$ may be viewed as the range in which the intermediate correlation function $R_0(\tau; a)$ is 0, and $|R_0(\tau; a)|+|S_m(\tau)|-|R_0(\tau; a)-S_m(\tau)|$ is all 0 in the range.

In contrast, the range of $R_0(\tau; a) \times S_m(\tau) > 0$ may be viewed as the main peak range of the intermediate correlation function $R_0(\tau; a)$. In this range, $|R_0(\tau; a)|+|S_m(\tau)|-|R_0(\tau; a)-S_m(\tau)|$ is $2S_m(\tau)$ for a satisfying $R_0(\tau; a) > S_m(\tau)$, and thus corresponds to peaks having a height of 2/N and a width of $$\frac{(a-\sqrt{1-a^2})}{N(a-1-\sqrt{1-a^2})}T_c.$$

However, in some cases, these peaks look like triangles, and may actually be polygons similar to triangles.

In accordance with Equation 6, the main correlation function $R_{proposed}(\tau; a)$ may be obtained by superposing all N waveforms in $0 \leq m \leq N-1$.

Accordingly, the main correlation function $R_{proposed}(\tau; a)$ is generated such that it has a main peak having a height fixed to 2 and a base width of $$\frac{(a-\sqrt{1-a^2})}{N(a-1-\sqrt{1-a^2})}T_c.$$

However, in some cases, the main peak looks like a triangle, and may actually be a polygon similar to a triangle.

This main correlation function $R_{proposed}(\tau; a)$ corresponds to a waveform in which all side peaks have been eliminated and only a main peak has been left, and the width of the main peak may be adjusted as desired without influence on the height thereof based on the main peak shape parameter a, thereby improving the slope of the inclined side of the main peak and finally the performance of signal tracking.

FIGS. 8 and 9 are diagrams illustrating main correlation functions in which only a main peak has been left for an apparatus for tracking a BOC signal according to an embodiment of the present invention.

In FIGS. 8 and 9, with respect to a $BOC_{sin}(kn,n)$ signal and a $BOC_{cos}(kn,n)$ signal, when k=1 and k=2, the waveforms of the conventional auto-correlation functions are compared with the waveforms of the main correlation functions proposed in the present invention.

The auto-correlation function of the original received BOC signal B(t) has not only a main peak but also side peaks.

In contrast, in accordance with the main correlation functions that are proposed in the present invention and have peak shapes whose widths are adjusted based on the main peak shape parameter a, all side peaks disappear and only a main peak is left.

Furthermore, in FIGS. 8 and 9, when k=1 and k=2, the widths of the main peaks of the conventional auto-correlation functions and the main correlation functions proposed in the present invention have no large difference, but the height of the main peaks of the conventional auto-correlation functions is 1 while the height of the main peaks of the main correlation functions proposed in the present invention is 2.

Accordingly, in accordance with the main correlation functions proposed in the present invention, it may possible to adjust the shape and slope of main peaks as desired while fixing the height thereof according to the value of the main peak shape parameter a. In particular, by increasing the value of the main peak shape parameter a, a sharper main peak can be acquired, and also higher signal tracking performance can be achieved.

Referring back to FIG. 3, the DLL 24 using such a main correlation function is described in greater detail.

In general, the DLL 24 determines whether two correlation values based on an early delay value preceding a desired delay value and a late delay value following the desired delay value have passed the apex of a main peak while driving a loop while gradually changing the delay values based on the two correlation values to which the early delay value and the late delay value have been applied.

In greater detail, for example, when a code delay value is gradually changed from −1 chip to +1 chip, an early correlation value based on an early delayed received signal having an early delay value larger than a current delay value reaches the left slope of a main peak and passes the apex of the main peak earlier than a late correlation value based a late delayed received signal having a late delay value smaller than the current delay value.

If the difference between the early correlation value and the late correlation value is tracked, the difference will continue to have a positive value, will gradually decrease from the point where the early correlation value passes the apex of the main peak when the early correlation value is located on the left slope of the main peak, will become 0 when the early correlation value and the late correlation value are symmetrical with respect to the apex, and will have a negative value when the early correlation value further proceed to the right slope of the main peak.

Through this observation, it may be said that the prompt correlation value reaches the apex at a point where the difference between the early correlation value and the late correlation value passes 0, that is, a zero-crossing point.

A discrimination function capable of discriminating the state of a prompt correlation value, such as the difference between the early correlation value and the late correlation value, is generally referred to as a discriminator. Although a discrimination function for a discriminator may be devised in various manners, a $$D(\tau) = R_{proposed}^2\left(\tau + \frac{\Delta}{2}; a\right) - R_{proposed}^2\left(\tau - \frac{\Delta}{2}; a\right) \tag{7}$$

In this case, $\Delta$ is the difference between the early delay value and the late delay value.

That is, if a change in a value obtained by subtracting the square of the result of the late main correlation function from the square of the result of the early main correlation function is tracked using such a discrimination function and then zero crossing is detected, it may be determined that the main correlation function has reached the apex of the main peak at the delay value.

Next, the operation of the DLL 24 is described based on the discussion so far set forth.

First, the local signal generation unit 31 generates an early and late delayed received signal pair $B(t+\tau+\Delta/2)$ and $B(t+\tau-\Delta/2)$, early delayed and late delayed, respectively, based on phase delay $\tau$ and a delay value difference $\Delta$ provided by the NCO 37, with respect to the received signal pulse train of a received BOC-modulated signal $B(t)$ in which N pulses successively occur within a single period $T_c$ of a spreading code chip, and then provides them to the early and late mixers 32a and 32b, respectively.

The early and late mixers 32a and 32b output an early and late mixed signal pairs, obtained by multiplying the received signal $B(t)$ by the early and late delayed received signal pair $B(t+\tau+\Delta/2)$ and $B(t+\tau-\Delta/2)$, to the early and late correlation units 33a and 33b, respectively.

The early and late correlation units 33a and 33b generate N early partial correlation functions $S_0(\tau+\Delta/2)$, $S_1(\tau+\Delta/2)$, ..., $S_{N-2}(\tau+\Delta/2)$, $S_{N-1}(\tau+\Delta/2)$ and N late partial correlation functions $S_0(\tau-\Delta/2)$, $S_1(\tau-\Delta/2)$, ..., $S_{N-2}(\tau-\Delta/2)$, $S_{N-1}(\tau-\Delta/2)$ by performing auto-correlation operations on the early and late mixed signal pair, as shown in Equation 3, with respect to the total time $T(0 \le t \le T)$.

The early combination unit 34a obtains an early intermediate correlation function $R_0(\tau+\Delta/2; a)$ by performing an elimination operation on an early sub-correlation function pair $T_1(\tau+\Delta/2; a)$ and $T_2(\tau+\Delta/2; a)$, obtained by combining first and last early partial correlation functions $S_0(\tau+\Delta/2)$ and $S_{N-1}(\tau+\Delta/2)$ based on a given main peak shape parameter a, as shown in Equation 4, so that only a main peak is left, as shown in Equation 5, and generates an early main correlation function $R_{proposed}(\tau+\Delta/2; a)$ by superposing results obtained by additionally performing an elimination operation on the early intermediate correlation function $R_0(\tau+\Delta/2; a)$ and each of the early partial correlation functions $S_m(\tau+\Delta/2)$, as shown in Equation 6.

The late combination unit 34b obtains a late intermediate correlation function $R_0(\tau-\Delta/2; a)$ by performing an elimination operation on a late sub-correlation function pair $T_1(\tau-\Delta/2; a)$ and $T_2(\tau-\Delta/2; a)$, obtained by combining first and last late partial correlation functions $S_0(\tau-\Delta/2)$ and $S_{N-1}(\tau-\Delta/2)$ based on a given main peak shape parameter a, as shown in Equation 4, so that only a main peak is left, as shown in Equation 5, and generates a late main correlation function $R_{proposed}(\tau-\Delta/2; a)$ by superposing results obtained by additionally performing an elimination operation on the late intermediate correlation function $R_0(\tau-\Delta/2; a)$ and each of the late partial correlation functions $S_m(\tau-\Delta/2)$, as shown in Equation 6.

Each of the early and late main correlation functions $R_{proposed}(\tau+\Delta/2; a)$ and $R_{proposed}(\tau-\Delta/2; a)$ has a main peak whose height is fixed to 2 and whose base width is $$\frac{(a-\sqrt{1-a^2})}{N(a-1-\sqrt{1-a^2})}T_c.$$

The discriminator mixer 35 outputs a discrimination output value obtained by subtracting the square of the late main correlation function $R_{proposed}(\tau-\Delta/2; a)$ from the square of the early main correlation function $R_{proposed}(\tau+\Delta/2; a)$, for example, in accordance with a predetermined discrimination function, such as Equation 7.

The loop filter 36 may filter out the noise component of the discrimination output of the discriminator mixer 35.

The NCO 37 determines the phase delay $\tau$ of the delayed received signal for the received signal based on the filtered discrimination output, and outputs the determined phase delay $\tau$ to the local signal generation unit 31.

For example, the NCO 37 may increase the phase delay $\tau$ by a predetermined interval and then output the increased phase delay $\tau$ to the local signal generation unit 31, on the ground that if the discrimination output is a positive value larger than a predetermined threshold value, this means that an early correlation value is larger than a late correlation value and also means that the applied phase delay $\tau$ is smaller than phase delay corresponding to the apex of a main peak in light of the shape of the main peak of a main correlation function.

Furthermore, if it is determined that the main correlation function value based on the phase delay $\tau$ is located at the apex of the main peak based on the filtered discrimination output, the NCO 37 outputs the value of phase delay $\tau$ at the time to the local code generation unit 22 as a code delay value.

FIG. 10 is a flowchart illustrating a method of tracking a BOC signal according to another embodiment of the present invention.

At step S101, with respect to the received signal pulse train of a received BOC-modulated signal $B(t)$ in which N pulses successively occur within a single period $T_c$ of a spreading code chip, a received signal pair $B(t+\tau+\Delta/2)$ and $B(t+\tau-\Delta/2)$ early and late delayed, respectively, based on phase delay $\tau$ and a delay value difference $\Delta$ is generated.

At step S102, early and late mixed signal pairs obtained by multiplying the received signal $B(t)$ with the early and late delayed received signal pair $B(t+\tau+\Delta/2)$ and $B(t+\tau-\Delta/2)$ are output.

At step S103, N early partial correlation functions $S_0(\tau+\Delta/2)$, $S_1(\tau+\Delta/2)$, ..., $S_{N-2}(\tau+\Delta/2)$, $S_{N-1}(\tau+\Delta/2)$ and N late partial correlation functions $S_0(\tau-\Delta/2)$, $S_1(\tau-\Delta/2)$, ..., $S_{N-2}(\tau-\Delta/2)$, $S_{N-1}(\tau-\Delta/2)$ are generated by performing an auto-correlation operation on the early and late mixed signal pairs, as shown in Equation 3 with respect to the total time $T(0 \le t \le T)$.

At step S104, an early intermediate correlation function $R_0(\tau+\Delta/2; a)$ is obtained by performing an elimination operation on an early sub-correlation function pair $T_1(\tau+\Delta/2; a)$ and $T_2(\tau+\Delta/2; a)$, obtained by combining first and last early partial correlation functions $S_0(\tau+\Delta/2)$ and $S_{N-1}(\tau+\Delta/2)$ based on a given main peak shape parameter a, as shown in Equation 4, so that only a main peak is left, as shown in Equation 5, and an early main correlation function $R_{proposed}(\tau+\Delta/2; a)$ is generated by superposing results obtained by additionally performing an elimination operation on each of the early intermediate correlation function $R_0(\tau+\Delta/2; a)$ and the early partial correlation functions $S_m(\tau+\Delta/2)$, as shown in Equation 6. Additionally, at step S104, a late intermediate correlation function $R_0(\tau-\Delta/2; a)$ is obtained by performing an elimination operation on a late sub-correlation function pair $T_1(\tau-\Delta/2; a)$ and $T_2(\tau-\Delta/2; a)$, obtained by combining first and last late partial correlation functions $S_0(\tau-\Delta/2)$ and $S_{N-1}(\tau-\Delta/2)$ based on a given main peak shape parameter a, as shown in Equation 4, so that only a main peak is left, as shown in Equation 5, and a late main correlation function $R_{proposed}(\tau-\Delta/2; a)$ is generated by superposing results obtained by additionally performing an elimination operation on each of the late intermediate correlation function $R_0(\tau-\Delta/2; a)$ and the late partial correlation functions $S_m(\tau-\Delta/2)$, as shown in Equation 6.

Each of the proposed early and late main correlation functions $R_{proposed}(\tau+\Delta/2; a)$ and $R_{proposed}(\tau-\Delta/2; a)$ has a main peak whose height is fixed to 2 and whose base width is $$\frac{(a-\sqrt{1-a^2})}{N(a-1-\sqrt{1-a^2})}T_c.$$

At step S105, a discrimination output value obtained by subtracting the square of the late main correlation function $R_{proposed}(\tau-\Delta/2; a)$ from the square of the early main correlation function $R_{proposed}(\tau+\Delta/2; a)$, for example, in accordance with a predetermined discrimination function, such as Equation 7, is output.

At selective step S106, the noise component of the discrimination output may be filtered out.

At step S107, the phase delay $\tau$ of the delayed received signal for the received signal may be determined based on the filtered discrimination output.

Furthermore, at step S108, if it is determined that the main correlation function value based on the phase delay $\tau$ is located at the apex of a main peak based on the filtered discrimination output, the value of phase delay $\tau$ at the time is output as a code delay value.

FIGS. 11 and 12 are graphs illustrating the performance of an apparatus and method for tracking a BOC signal according to embodiments of the present invention.

Referring to FIG. 11, in order to compare the conventional BOC signal tracking schemes, that is, the conventional schemes 1 and 2 described in the section "Description of the Related Art," with the novel scheme using a main correlation function according to the present invention with respect to a $BOC_{sin}(kn,n)$ signal when k=1 and k=2, curves for tracking error standard deviation (TESD) versus carrier-to-noise ratio (CNR) are plotted for the respective schemes.

In the method proposed in the present invention, the main peak shape parameter a is given as 0.1, 0.2, 0.3 and 0.4.

When k=1 and k=2, with respect to all the values of the main peak shape parameter a, the method of the present invention exhibited excellent results compared to the auto-correlation function technique.

When k=1, the method of the present invention exhibited excellent results compared to the conventional BOC signal tracking techniques in the case where the value of the main peak shape parameter a was equal to or larger than 0.4, and exhibited a similar or excellent result in the case where the value of the main peak shape parameter a was smaller than 0.4.

When k=2, the method of the present invention exhibited excellent results compared to the conventional BOC signal tracking techniques in the case where the value of the main peak shape parameter a was equal to or larger than 0.3, and exhibited a similar or partially excellent result in the case where the value of the main peak shape parameter a was smaller than 0.3.

Furthermore, referring to FIG. 12, in order to compare conventional BOC signal tracking schemes applicable to a $BOC_{cos}(kn,n)$ signal, that is, the conventional schemes 2 and 3 described in the section "Description of the Related Art," with the novel scheme using a main correlation function according to the present invention with respect to the $BOC_{cos}(kn,n)$ signal when k=1 and k=2, curves for tracking error standard deviation (TESD) versus carrier-to-noise ratio (CNR) are plotted for the respective schemes.

In the method proposed in the present invention, the main peak shape parameter a is given as 0.1, 0.2, 0.3 and 0.4.

When k=1 and k=2, with respect to all the values of the main peak shape parameter a, the method of the present invention exhibited excellent results compared to the auto-correlation function technique.

When k=1, the method of the present invention exhibited excellent results compared to the conventional BOC signal tracking techniques in the case where the value of the main peak shape parameter a was equal to or larger than 0.3, and exhibited a similar or partially excellent result in the case where the value of the main peak shape parameter a was smaller than 0.3.

When k=2, the method of the present invention exhibited excellent results compared to the conventional BOC signal tracking techniques in the case where the value of the main peak shape parameter a was equal to or larger than 0.2, and exhibited a similar or excellent result in the case where the value of the main peak shape parameter a was smaller than 0.2.

In accordance with at least one embodiment of the present invention, there are provided a method of generating a BOC correlation function based on partial correlation functions, an apparatus for tracking a BOC signal, and a spread spectrum signal receiver system using the same, which are capable of overcoming the disadvantages of conventional BOC signal tracking techniques in which the conventional BOC signal tracking techniques can eliminate only side peaks close to a main peak but cannot eliminate side peaks remote from the main peak, or can be applied only to a $BOC_{sin}(kn,n)$ signal but cannot be applied to a $BOC_{cos}(kn,n)$ signal, thereby being applicable to both $BOC_{sin}(kn,n)$ and $BOC_{cos}(kn,n)$ signals.

In accordance with at least one embodiment of the present invention, there are provided a method of generating a BOC correlation function based on partial correlation functions, an apparatus for tracking a BOC signal, and a spread spectrum signal receiver system using the same, which are capable of not only eliminating side peaks but also adjusting the width and height of a main peak.

In accordance with at least one embodiment of the present invention, there are provided a method of generating a BOC correlation function based on partial correlation functions, an apparatus for tracking a BOC signal, and a spread spectrum signal receiver system using the same, which are capable of not only eliminating side peaks but also increasing the height of a main peak while reducing the width of the main peak.

The above embodiments and the accompanying drawings are intended merely to clearly illustrate part of the technical spirit of the present invention, and it will be apparent to those skilled in the art that modifications and specific embodiments that those skilled in the art can easily derive from the present specification and the accompanying drawings are all included in the range of the rights of the present invention.

Furthermore, the apparatus according to the present invention may be implemented as computer-readable code stored on a computer-readable storage medium. The computer-readable storage medium includes all types of storage devices on which data that can be read by a computer system can be stored. Examples of the storage medium include ROM, RAM, an optical disk, magnetic tape, a floppy disk, hard disk, nonvolatile memory. Furthermore, the computer-readable medium may be distributed across a computer system connected over a network, and thus computer-readable code may be stored and executed in a distributed manner.

What is claimed is:

1. A delay lock loop (DLL) to track a code delay phase value for a local code to be correlated with a received BOC-modulated signal in which N pulses successively occur in a single period $T_c$ of a spreading code chip in a spread spectrum signal receiver system, the DLL comprising:
   a processor configured to:
   generate an early and late delayed received signal pair $B(t+\tau+\Delta/2)$ and $B(t+\tau-\Delta/2)$, based on phase delay $\tau$ and a delay value difference $\Delta$, with respect to a received signal pulse train of a received signal $B(t)$, wherein the $B(t+\tau+\Delta/2)$ is an early signal and the $B(t+\tau-\Delta/2)$ is a late signal,
   generate N early partial correlation functions $S_m(\tau+\Delta/2)$ (where $0 \le m \le N-1$) and N late partial correlation functions $S_m(\tau-\Delta/2)$ by performing an auto-correlation operation on the early and late delayed received signal pair $B(t+\tau+\Delta/2)$ and $B(t+\tau-\Delta/2)$ with respect to a total time $T(0 \le t \le T)$,
   obtain an early intermediate correlation function $R_0(\tau+\Delta/2;a)$ by performing an elimination operation on an early sub-correlation function pair $T_1(\tau+\Delta/2;a)$ and $T_2(\tau+\Delta/2;a)$ obtained by combining first and last early partial correlation functions $S_0(\tau+\Delta/2)$ and $S_{N-1}(\tau+\Delta/2)$ based on a main peak shape parameter a such that only a main peak is left, and generate an early main correlation function $R_{proposed}(\tau+\Delta/2;a)$ by superposing results obtained by additionally performing an elimination operation on the early intermediate correlation function $R_0(\tau+\Delta/2;a)$ and each of the early partial correlation functions $S_m(\tau+\Delta/2)$,
   obtain a late intermediate correlation function $R_0(\tau-\Delta/2;a)$ by performing an elimination operation on a late sub-correlation function pair $T_1(\tau-\Delta/2;a)$ and $T_2(\tau-\Delta/2;a)$ obtained by combining first and last late partial correlation functions $S_0(\tau-\Delta/2)$ and $S_{N-1}(\tau-\Delta/2)$ based on a main peak shape parameter a, such that only a main peak is left, and generate a late main correlation function $R_{proposed}(\tau-\Delta/2;a)$ by superposing results obtained by additionally performing an elimination operation on the late intermediate correlation function $R_0(\tau-\Delta/2;a)$ and each of the late partial correlation functions $S_m(\tau-\Delta/2)$, and
   determine a phase delay $\tau$ for the received signal based on a discrimination output of a discrimination function based on values of the early and late main correlation functions, and
   output the determined phase delay $\tau$,
   wherein the elimination operation is related to an algebraic relation in which when real numbers x and y are $xy \le 0$, $|x|+|y|-|x-y|=0$.

2. The DLL of claim 1, wherein the N early partial correlation functions $S_m(\tau+\Delta/2)$ or the N late partial correlation functions $S_m(\tau-\Delta/2)$, when the received signal $B(t)$ is viewed as a sum of N partial received signals obtained by superposing an m-th ($0 \le m \le N-1$) pulse of N pulses present within each chip period $T_c$ on the other m-th pulses, are obtained by performing an auto-correlation operation on each of the N partial received signals based on the following equation:

$$R(\tau) = \frac{1}{PT} \int_0^T B(t)B(t+\tau)\,dt$$

$$= \sum_{m=0}^{N-1} \sum_{j=0}^{T/T_c-1} \frac{1}{PT} \int_{(jN+m)}^{(jN+m+1)} B(t)B(t+\tau)\,dt$$

$$= \sum_{m=0}^{N-1} S_m(\tau)$$

wherein P is power of the received signal $B(t)$, T is a period of the pseudo noise code, $T_c$ is a chip period, and $j$ ($0 \le j \le T/T_c-1$) is an index indicative of each pulse of a pulse train of an m-th partial received signal.

3. The DLL of claim 1, wherein the early sub-correlation function pair $T_1(\tau+\Delta/2;a)$ and $T_2(\tau+\Delta/2;a)$ is generated such that the early sub-correlation function pair is symmetrical with respect to a vertical axis, in response to the early sub-correlation function pair overlapping the late sub-correlation function pair, or the late sub-correlation function pair $T_1(\tau-\Delta/2;a)$ and $T_2(\tau-\Delta/2;a)$ is generated such that the late sub-correlation function pair is symmetrical with respect to the vertical axis, in response to the early sub-correlation function pair overlapping the late sub-correlation function pair.

4. The DLL of claim 1, wherein the early sub-correlation function pair $T_1(\tau+\Delta/2;a)$ and $T_2(\tau+\Delta/2;a)$ or the late sub-correlation function pair $T_1(\tau-\Delta/2;a)$ and $T_2(\tau-\Delta/2;a)$ is generated based on the following equation:

$$\begin{cases} T_1(\tau;a) = \sqrt{\dfrac{1}{a^2+1}}\, S_0(\tau) - a\sqrt{\dfrac{1}{a^2+1}}\, S_{N-1}(\tau), \\ T_2(\tau;a) = a\sqrt{\dfrac{1}{a^2+1}}\, S_0(\tau) - \sqrt{\dfrac{1}{a^2+1}}\, S_{N-1}(\tau) \end{cases}.$$

5. The DLL of claim 1, wherein the early intermediate correlation function $R_0(\tau+\Delta/2;a)$ or the late intermediate correlation function $R_0(\tau-\Delta/2;a)$ is generated based on the following equation:

$$R_0(\tau;a) = |T_1(\tau;a)| + |T_2(\tau;a)| - |T_1(\tau;a) - T_2(\tau;a)|.$$

6. The DLL of claim 1, wherein the early main correlation function $R_{proposed}(\tau+\Delta/2; a)$ or the late main correlation function $R_{proposed}(\tau-\Delta/2; a)$ is generated based on the following equation:

$$R_{proposed}(\tau;a) = \sum_{m=0}^{N-1} |R_0(\tau;a)| + |S_m(\tau)| - |R_0(\tau;a) - S_m(\tau)|.$$

7. The DLL of claim 6, wherein each of the early main correlation function $R_{proposed}(\tau+\Delta/2;a)$ and the late main correlation function $R_{proposed}(\tau-\Delta/2;a)$ is generated to comprise a waveform comprising a main peak comprising a height of 2 and a base width of $$\frac{(a - \sqrt{1-a^2})}{N(a - 1 - \sqrt{1-a^2})} T_c$$

by performing an elimination operation on each of the early and late sub-correlation function pairs.

8. The DLL of claim 1, wherein the discrimination function is selected to determine whether a main correlation function value based on the phase delay τ is located at an apex of the main peak based on the discrimination output.

9. The DLL of claim 8, wherein the discrimination function D(τ) is defined as the following equation:

$$D(\tau) = R_{proposed}^2\left(\tau + \frac{\Delta}{2}; a\right) - R_{proposed}^2\left(\tau - \frac{\Delta}{2}; a\right).$$

10. The DLL of claim 9, wherein the code delay phase value for the local code is determined to be a value of the phase delay τ, in response to zero crossing of the discrimination function D(τ) being detected.

11. A BOC signal tracking method to track a code delay phase value for a local code to be correlated with a received BOC-modulated signal in which N pulses successively occur in a single period $T_c$ of a spreading code chip in a spread spectrum signal receiver system, the method comprising:
generating an early and late delayed received signal pair B(t+τ+Δ/2) and B(t+τ−Δ/2), based on phase delay τ and a delay value difference Δ, with respect to a received signal pulse train of a received signal B(t), wherein the B(t+τ+Δ/2) is an early signal and the B(t+τ−Δ/2) is a late signal;
generating N early partial correlation functions $S_m(\tau+\Delta/2)$ (where 0≤m≤N−1) and N late partial correlation functions $S_m(\tau-\Delta/2)$ by performing an auto-correlation operation on the early and late mixed signal pair B(t+τ+Δ/2) and B(t+τ−Δ/2) with respect to a total time T(0≤t≤T);
obtaining an early intermediate correlation function $R_0(\tau+\Delta/2;a)$ by performing an elimination operation on an early sub-correlation function pair $T_1(\tau+\Delta/2;a)$ and $T_2(\tau+\Delta/2;a)$ obtained by combining first and last early partial correlation functions $S_0(\tau+\Delta/2)$ and $S_{N-1}(\tau+\Delta/2)$ based on a main peak shape parameter a, such that only a main peak is left, and generating an early main correlation function $R_{proposed}(\tau+\Delta/2;a)$ by superposing results obtained by additionally performing an elimination operation on the early intermediate correlation function $R_0(\tau+\Delta/2;a)$ and each of the early partial correlation functions $S_m(\tau+\Delta/2)$;
obtaining a late intermediate correlation function $R_0(\tau-\Delta/2;a)$ by performing an elimination operation on a late sub-correlation function pair $T_1(\tau-\Delta/2;a)$ and $T_2(\tau-\Delta/2;a)$ obtained by combining first and last late partial correlation functions $S_0(\tau-\Delta/2)$ and $S_{N-1}(\tau-\Delta/2)$ based on a given main peak shape parameter a such that only a main peak is left, and generating a late main correlation function $R_{proposed}(\tau-\Delta/2;a)$ by superposing results obtained by additionally performing an elimination operation on the late intermediate correlation function $R_0(\tau-\Delta/2;a)$ and each of the late partial correlation functions $S_m(\tau-\Delta/2)$; and
determining a phase delay τ for the received signal based on a discrimination output of a discrimination function based on values of the early and late main correlation functions,
wherein the elimination operation is an operation related to an algebraic relation in which when real numbers x and y are xy≤0, |x|+|y|−|x−y|=0.

12. The BOC signal tracking method of claim 11, wherein the N early partial correlation functions $S_m(\tau+\Delta/2)$ or the N late partial correlation functions $S_m(\tau-\Delta/2)$, when the received signal B(t) is viewed as a sum of N partial received signals obtained by superposing an m-th (0≤m≤N−1) pulse of N pulses present within each chip period $T_c$ on the other m-th pulses, are obtained by performing an auto-correlation operation on each of the N partial received signals based on the following equation:

$$R(\tau) = \frac{1}{PT}\int_0^T B(t)B(t+\tau)\,dt$$

$$= \sum_{m=0}^{N-1}\sum_{j=0}^{T/T_c-1}\frac{1}{PT}\int_{(jN+m)}^{(jN+m+1)} B(t)B(t+\tau)\,dt$$

$$= \sum_{m=0}^{N-1} S_m(\tau)$$

wherein P is power of the received signal B(t), T is a period of the pseudo noise code, $T_c$ is a chip period, and j (0≤j≤T/$T_c$−1) is an index indicative of each pulse of a pulse train of an m-th partial received signal.

13. The BOC signal tracking method of claim 11, wherein the early sub-correlation function pair $T_1(\tau+\Delta/2;a)$ and $T_2(\tau+\Delta/2;a)$ is generated such that the early sub-correlation function pair is symmetrical with respect to a vertical axis, in response to the early sub-correlation function pair overlapping the late sub-correlation function pair, or the late sub-correlation function pair $T_1(\tau-\Delta/2;a)$ and $T_2(\tau-\Delta/2;a)$ is generated such that the late sub-correlation function pair is symmetrical with respect to a vertical axis, in response to the early sub-correlation function pair overlapping the late sub-correlation function pair.

14. The BOC signal tracking method of claim 11, wherein the early sub-correlation function pair $T_1(\tau+\Delta/2;a)$ and $T_2(\tau+\Delta/2;a)$ or the late sub-correlation function pair $T_1(\tau-\Delta/2;a)$ and $T_2(\tau-\Delta/2;a)$ is generated based on the following equation:

$$\begin{cases} T_1(\tau;a) = \sqrt{\frac{1}{a^2+1}}\,S_0(\tau) - a\sqrt{\frac{1}{a^2+1}}\,S_{N-1}(\tau), \\ T_2(\tau;a) = a\sqrt{\frac{1}{a^2+1}}\,S_0(\tau) - \sqrt{\frac{1}{a^2+1}}\,S_{N-1}(\tau) \end{cases}$$

15. The BOC signal tracking method of claim 11, wherein the early intermediate correlation function $R_0(\tau+\Delta/2;a)$ or the late intermediate correlation function $R_0(\tau-\Delta/2;a)$ is generated based on the following equation:

$$R_0(\tau;a)=|T_1(\tau;a)|+|T_2(\tau;a)|-|T_1(\tau;a)-T_2(\tau;a)|.$$

16. The BOC signal tracking method of claim 11, wherein the early main correlation function $R_{proposed}(\tau+\Delta/2;a)$ or the late main correlation function $R_{proposed}(\tau-\Delta/2;a)$ is generated based on the following equation:

$$R_{proposed}(\tau;a) = \sum_{m=0}^{N-1} |R_0(\tau;a)|+|S_m(\tau)|-|R_0(\tau;a)-S_m(\tau)|.$$

17. The BOC signal tracking method of claim 16, wherein each of the early main correlation function $R_{proposed}(\tau+\Delta/2;a)$ and the late main correlation function $R_{proposed}(\tau-\Delta/2;a)$ is generated to comprise a waveform comprising a main peak comprising a height of 2 and a base width of $$\frac{(a-\sqrt{1-a^2})}{N(a-1-\sqrt{1-a^2})}T_c$$

by performing an elimination operation on each of the early and late sub-correlation function pairs.

18. The BOC signal tracking method of claim 11, wherein the discrimination function is selected to determine whether a main correlation function value based on the phase delay $\tau$ is located at an apex of the main peak based on the discrimination output.

19. The BOC signal tracking method of claim 18, wherein the discrimination function $D(\tau)$ is defined as the following equation:

$$D(\tau) = R_{proposed}^2\left(\tau + \frac{\Delta}{2}; a\right) - R_{proposed}^2\left(\tau - \frac{\Delta}{2}; a\right).$$

20. The BOC signal tracking method of claim 19, wherein the code delay phase value for the local code is determined to be a value of the phase delay $\tau$, in response to zero crossing of the discrimination function $D(\tau)$ being detected.

\* \* \* \* \*